US011818698B2

United States Patent
Yang et al.

(10) Patent No.: US 11,818,698 B2
(45) Date of Patent: Nov. 14, 2023

(54) DISTRIBUTED RESOURCE UNIT TRANSMISSION

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/322,097

(22) Filed: May 17, 2021

(65) Prior Publication Data
US 2022/0369315 A1 Nov. 17, 2022

(51) Int. Cl.
*H04W 72/0453* (2023.01)
*H04L 5/00* (2006.01)
*H04W 52/34* (2009.01)

(52) U.S. Cl.
CPC ....... *H04W 72/0453* (2013.01); *H04L 5/0044* (2013.01); *H04W 52/346* (2013.01)

(58) Field of Classification Search
CPC ........... H04W 72/0453; H04W 52/346; H04W 52/367; H04W 52/34; H04L 5/0044;
(Continued)

(56) References Cited

U.S. PATENT DOCUMENTS

2009/0285168 A1* 11/2009 Choi ............... H04L 5/0042
370/329
2012/0263211 A1* 10/2012 Porat ............... H04L 5/0044
375/219
(Continued)

FOREIGN PATENT DOCUMENTS

WO  WO2016137984 A1 *  2/2016 ......... H04W 56/001
WO  WO-2016137984 A1  9/2016
(Continued)

OTHER PUBLICATIONS

International Search Report and Written Opinion PCT/US2022/025613—ISA/EPO—dated Jul. 12, 2022 (2104870WO).

*Primary Examiner* — Hassan Kizou
*Assistant Examiner* — Oladiran Gideon Olaleye
(74) *Attorney, Agent, or Firm* — Arun Swain

(57) ABSTRACT

This disclosure provides methods, devices and systems for increasing the transmit power of wireless communication devices operating on power spectral density (PSD)-limited wireless channels. Some implementations more specifically relate to physical layer (PHY) convergence protocol (PLCP) protocol data unit (PPDU) designs that support distributed transmission. In some implementations, a PPDU may be generated based on one or more legacy tone plans. In such implementations, a portion of the PPDU may be modulated on a number (M) of tones representing a logical RU, and the M tones may be further mapped to M noncontiguous subcarrier indices in accordance with a distributed tone plan. In some other implementations, a PPDU may be generated based on a distributed tone plan. In such implementations, a portion of the PPDU may be modulated on a number (M) of tones coinciding with M noncontiguous subcarrier indices in accordance with the distributed tone plan.

23 Claims, 18 Drawing Sheets

(58) Field of Classification Search
CPC .............. H04L 5/0069; H04L 27/2602; H04L 27/26132; H04L 5/0041
USPC ....................................................... 370/329
See application file for complete search history.

(56) References Cited

U.S. PATENT DOCUMENTS

| | | |
|---|---|---|
| 2013/0044725 A1 | 2/2013 | Chun et al. |
| 2016/0119047 A1* | 4/2016 | Lee ..................... H04L 27/2613 370/329 |
| 2016/0142187 A1* | 5/2016 | Yang ....................... H04L 5/003 370/328 |
| 2016/0212246 A1* | 7/2016 | Seok ..................... H04L 1/0631 |
| 2016/0242177 A1* | 8/2016 | Seok ..................... H04L 69/322 |
| 2017/0048823 A1* | 2/2017 | Bharadwaj ............ H04W 72/04 |
| 2017/0126529 A1* | 5/2017 | Yang ................... H04L 27/2602 |
| 2019/0110261 A1* | 4/2019 | Chen ..................... H04L 5/0007 |
| 2019/0268805 A1* | 8/2019 | Lee ......................... H04L 25/00 |
| 2020/0014509 A1 | 1/2020 | Asterjadhi et al. |
| 2020/0287759 A1* | 9/2020 | Van Nee ............. H04L 27/2613 |
| 2021/0144696 A1* | 5/2021 | Cariou .............. H04W 72/1268 |
| 2022/0278771 A1* | 9/2022 | Park ................... H04L 27/2602 |

FOREIGN PATENT DOCUMENTS

| | | | | |
|---|---|---|---|---|
| WO | WO2021006494 A1 * | 6/2020 | ........... | H04L 1/0004 |
| WO | WO-2021006494 A1 | 1/2021 | | |

\* cited by examiner

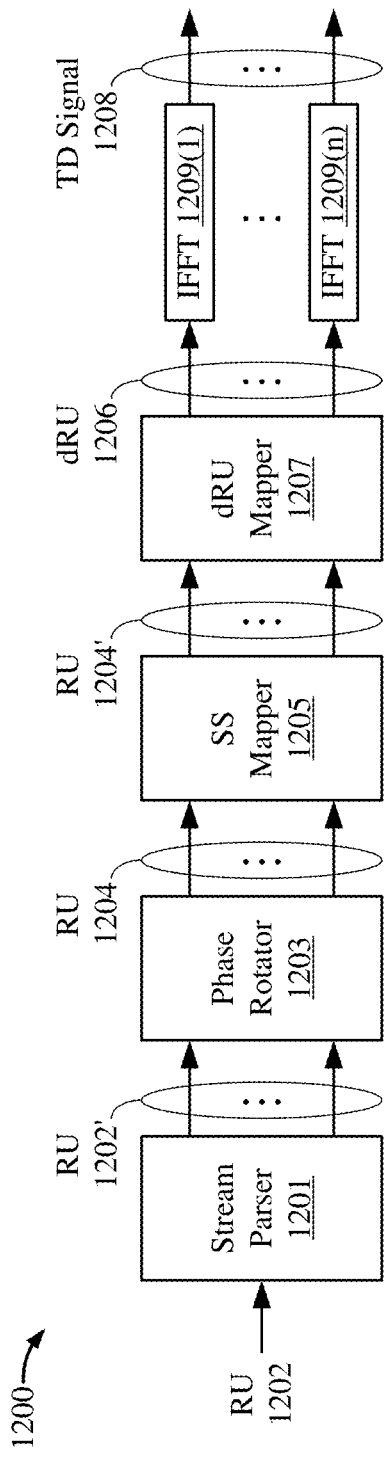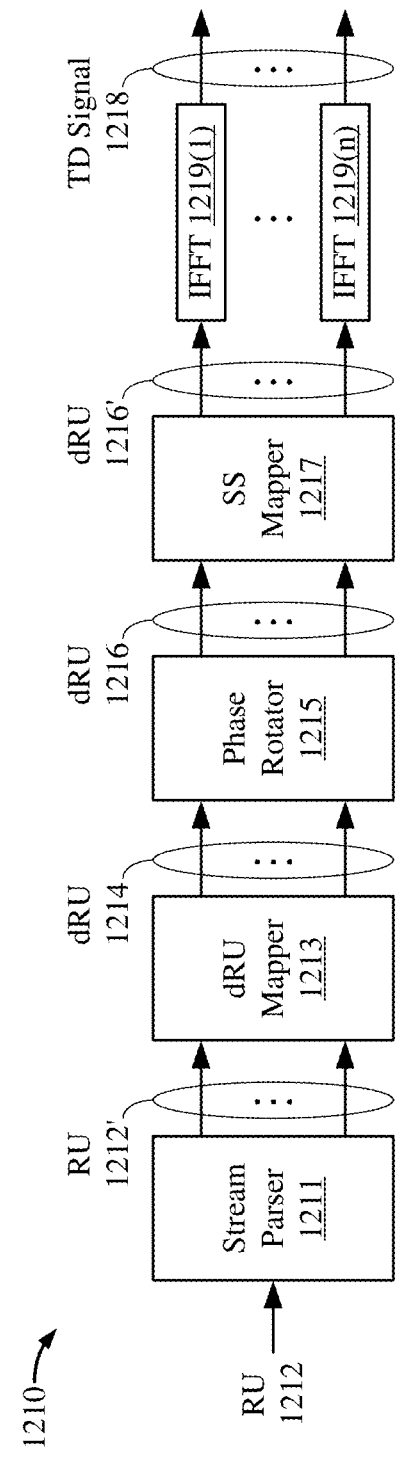

DISTRIBUTED RESOURCE UNIT TRANSMISSION

TECHNICAL FIELD

This disclosure relates generally to wireless communication, and more specifically to packet transmissions using distributed resource units (dRUs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include generating a physical layer (PHY) convergence protocol (PLCP) protocol data unit (PPDU) including a PHY preamble and a payload based on one or more legacy tone plans; modulating a first portion of the PPDU on a number (N) of tones coinciding with N contiguous subcarrier indices spanning a wireless channel in accordance with the one or more legacy tone plans; modulating a second portion of the PPDU on a number (M) of tones representing a logical resource unit (RU) associated with the one or more legacy tone plans; mapping the M tones to M noncontiguous subcarrier indices associated with the wireless channel in accordance with a distributed tone plan, where the M noncontiguous subcarrier indices are a subset of the N contiguous subcarrier indices; and transmitting the PPDU over the wireless channel.

In some implementations, the first portion of the PPDU may include a legacy short training field (L-STF), a legacy long training field (L-LTF), a legacy signal field (L-SIG), and a universal signal field (U-SIG) of the PHY preamble. In some implementations, the first portion of the PPDU may further include a non-legacy signal field of the PHY preamble. In some implementations, the second portion of the PPDU may include the payload and a non-legacy long training field (LTF) of the PHY preamble. In some implementations, the method may further include modulating a non-legacy short training field (STF) of the PHY preamble on a plurality of tones associated with the wireless channel in accordance with the one or more legacy tone plans, where the non-legacy STF is transmitted with the same transmit power as the second portion of the PPDU.

In some implementations, the generating of the PPDU may include determining a bandwidth of the wireless channel; determining a sequence of LTF values associated with the bandwidth of the wireless channel; and selecting a subset of the LTF values based on locations of the M noncontiguous subcarrier indices relative to the wireless channel, where the non-legacy LTF includes only the subset of LTF values. In some other implementations, the generating of the PPDU may include determining a bandwidth of the wireless channel; determining a sequence of LTF values associated with the bandwidth of the wireless channel; and selecting a subset of the LTF values based on a location of the logical RU relative to the bandwidth of the wireless channel, where the non-legacy LTF includes only the subset of LTF values.

In some implementations, the M noncontiguous subcarrier indices may coincide with a plurality of subchannels of the wireless channel that have the same bandwidth and power spectral density (PSD) limit, where each of the plurality of subchannels includes one or more of the M noncontiguous subcarrier indices. In some implementations, the method may further include determining a transmit power associated with the transmission of the second portion of the PPDU based on the PSD limit, where the transmit power is evenly distributed across the M noncontiguous subcarrier indices. In some other implementations, the method may further include determining a transmit power associated with the transmission of the second portion of the PPDU based on the PSD limit, where the transmit power is evenly distributed across the plurality of subchannels.

In some implementations, the method may further include mapping the second portion of the PPDU to a plurality of spatial streams and applying a cyclic-shift delay (CSD) to one or more spatial streams of the plurality of spatial streams prior to the mapping of the M tones to the M noncontiguous subcarrier indices. In some other implementations, the method may further include mapping the second portion of the PPDU to a plurality of spatial streams and applying a CSD to one or more spatial streams of the plurality of spatial streams after the mapping of the M tones to the M noncontiguous subcarrier indices.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a PPDU including a PHY preamble and a payload based on one or more legacy tone plans; modulating a first portion of the PPDU on a number (N) of tones coinciding with N contiguous subcarrier indices spanning a wireless channel in accordance with the one or more legacy tone plans; modulating a second portion of the PPDU on a number (M) of tones representing a logical RU associated with the one or more legacy tone plans; mapping the M tones to M noncontiguous subcarrier indices associated with the wireless channel in accordance with a distributed tone plan, where the M noncontiguous subcarrier indices are a subset of the N contiguous subcarrier indices; and transmitting the PPDU over the wireless channel.

Another innovative aspect of the subject matter described in this disclosure can be implemented as a method of wireless communication. The method may be performed by a wireless communication device, and may include generating a PPDU including a PHY preamble and a payload based on a distributed tone plan; modulating a first portion of the PPDU on a number (N) of tones coinciding with N contiguous subcarrier indices spanning a wireless channel in accordance with one or more legacy tone plans; modulating a second portion of the PPDU on a number (M) of tones coinciding with M noncontiguous subcarrier indices associated with the wireless channel in accordance with the distributed tone plan, where the M noncontiguous subcarrier indices are a subset of the N contiguous subcarrier indices; and transmitting the PPDU over the wireless channel.

In some implementations, the first portion of the PPDU may include an L-STF, an L-LTF, an L-SIG, and a U-SIG of the PHY preamble. In some implementations, the first portion of the PPDU may further include a non-legacy signal field of the PHY preamble. In some implementations, the second portion of the PPDU may include the payload and a non-legacy LTF of the PHY preamble.

In some implementations, the generating of the PPDU may include selecting a sequence of LTF values associated with the distributed tone plan, where the non-legacy LTF includes the sequence of LTF values. In some other implementations, the generating of the PPDU may include selecting a sequence of STF values associated with the distributed tone plan, where the non-legacy STF includes the sequence of STF values. In some implementations, the sequence of STF values may be equal to the sequence of LTF values.

In some implementations, the M noncontiguous subcarrier indices may coincide with a plurality of subchannels of the wireless channel that have the same bandwidth and PSD limit, where each of the plurality of subchannels includes one or more of the M noncontiguous subcarrier indices. In some implementations, the method may further include determining a transmit power associated with the transmission of the second portion of the PPDU based on the PSD limit, where the transmit power is evenly distributed across the M noncontiguous subcarrier indices. In some other implementations, the method may further include determining a transmit power associated with the transmission of the second portion of the PPDU based on the PSD limit, where the transmit power is evenly distributed across the plurality of subchannels.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a PPDU including a PHY preamble and a payload based on a distributed tone plan; modulating a first portion of the PPDU on a number (N) of tones coinciding with N contiguous subcarrier indices spanning a wireless channel in accordance with one or more legacy tone plans; modulating a second portion of the PPDU on a number (M) of tones coinciding with M noncontiguous subcarrier indices associated with the wireless channel in accordance with the distributed tone plan, where the M noncontiguous subcarrier indices are a subset of the N contiguous subcarrier indices; and transmitting the PPDU over the wireless channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12A shows a block diagram of an example transmit (TX) processing chain for a wireless communication device according to some implementations.

FIG. 12B shows a block diagram of another example TX processing chain for a wireless communication device according to some implementations.

Like reference numbers and designations in the various drawings indicate like elements.

DETAILED DESCRIPTION

Figure 1:
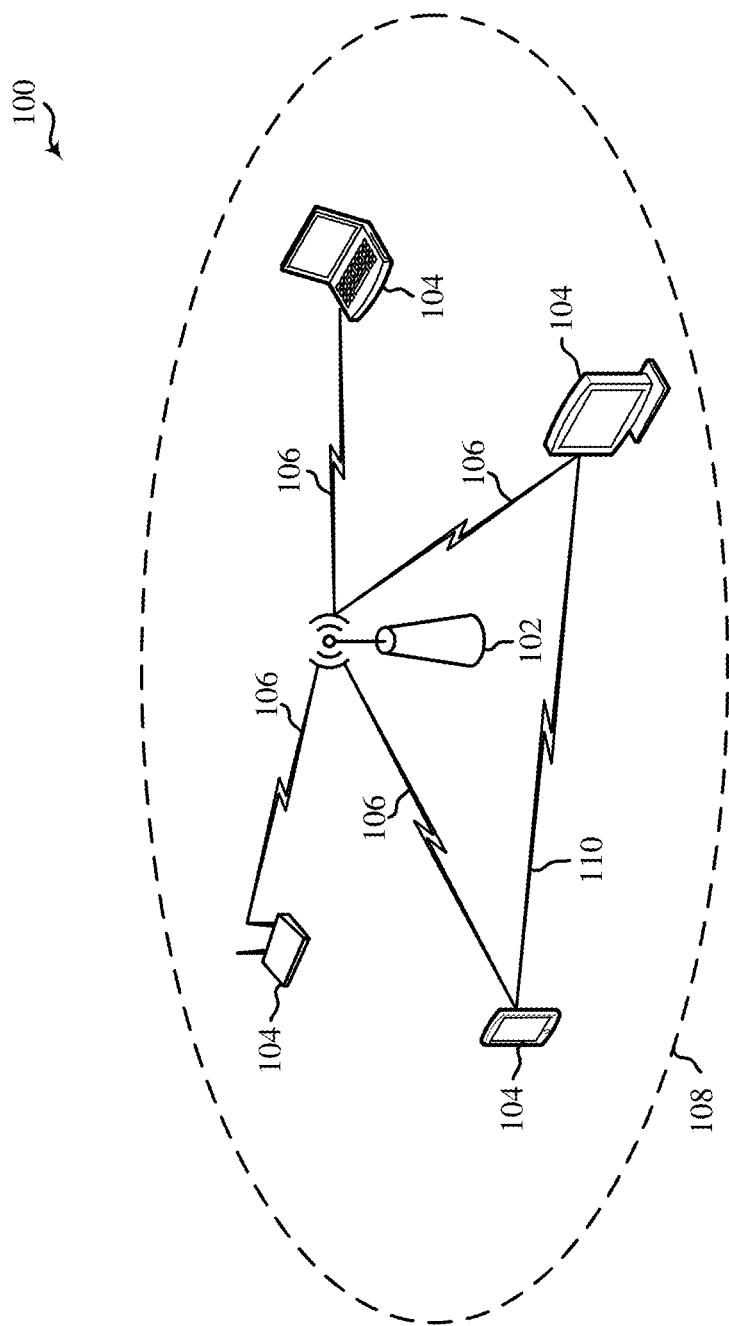
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to increasing the transmit power of wireless communication devices operating on power spectral density (PSD)-limited wireless channels, and more particularly, to physical layer (PHY) convergence protocol (PLCP) protocol data unit (PPDU) designs that support distributed transmission. As used herein, the term "distributed transmission" refers to the transmission of at least a portion of a PPDU on noncontiguous tones (or subcarriers) spanning a wireless channel. In contrast, the term "contiguous transmission" refers to the transmission of at least a portion of a PPDU on one or more sets of contiguous tones that represent one or more resource units (RUs), respectively, as defined by existing versions of the IEEE 802.11 standard. In some implementations, a wireless communication device may generate a PPDU based on one or more legacy tone plans. In such implementations, the wireless communication device may modulate a portion of the PPDU on a number (M) of tones representing a logical RU associated with the one or more legacy tone plans and may further map the M tones to M noncontiguous subcarrier indices associated with a wireless channel in accordance with a distributed tone plan. In some other implementations, a wireless communication device may generate a PPDU based directly on a distributed tone plan. In such implementations, the wireless communication device may modulate a portion of the PPDU on a number (M) of tones coinciding with M noncontiguous subcarrier indices associated with a wireless channel in accordance with the distributed tone plan.

Particular implementations of the subject matter described in this disclosure can be implemented to realize one or more of the following potential advantages. Distributed transmission provides greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, aspects of the present disclosure may increase the overall transmit power of the PPDU without exceeding the PSD limits of the wireless channel. For example, the distributed tone plan may reduce the total number of tones modulated by the device on any 1-MHz subchannel of the wireless channel. As a result, the wireless communication device may increase its per-tone transmit power without exceeding the PSD limits. Further, distributed transmissions by multiple wireless communication devices can be multiplexed onto a shared wireless channel thus increasing the transmit power of each device without sacrificing spectral efficiency. Such increases in transmit power can be combined with any modulation and coding scheme (MCS) to increase the range and throughput of wireless communications on PSD-limited wireless channels. Distributed transmissions also may improve the packet detection and channel estimation capabilities of the wireless communication devices.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
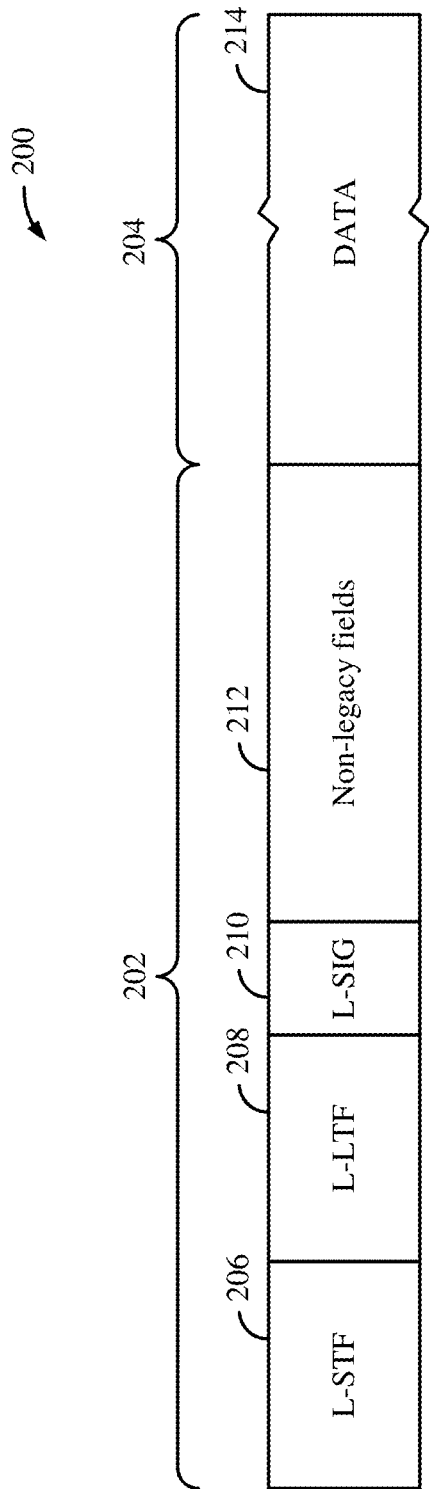
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
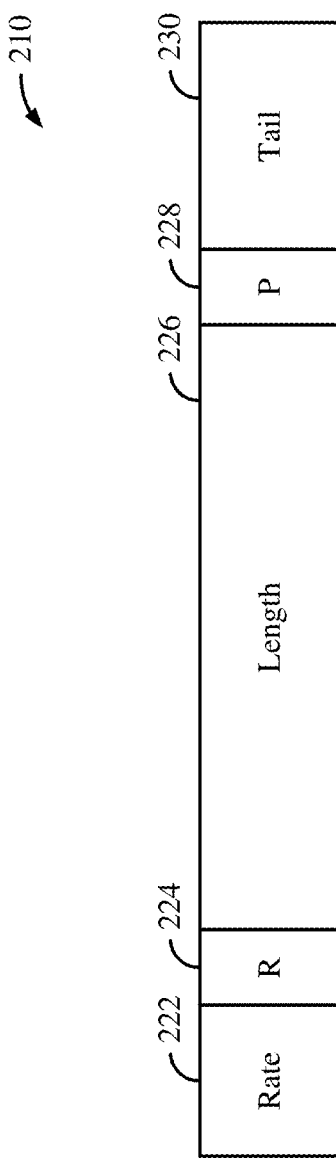
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
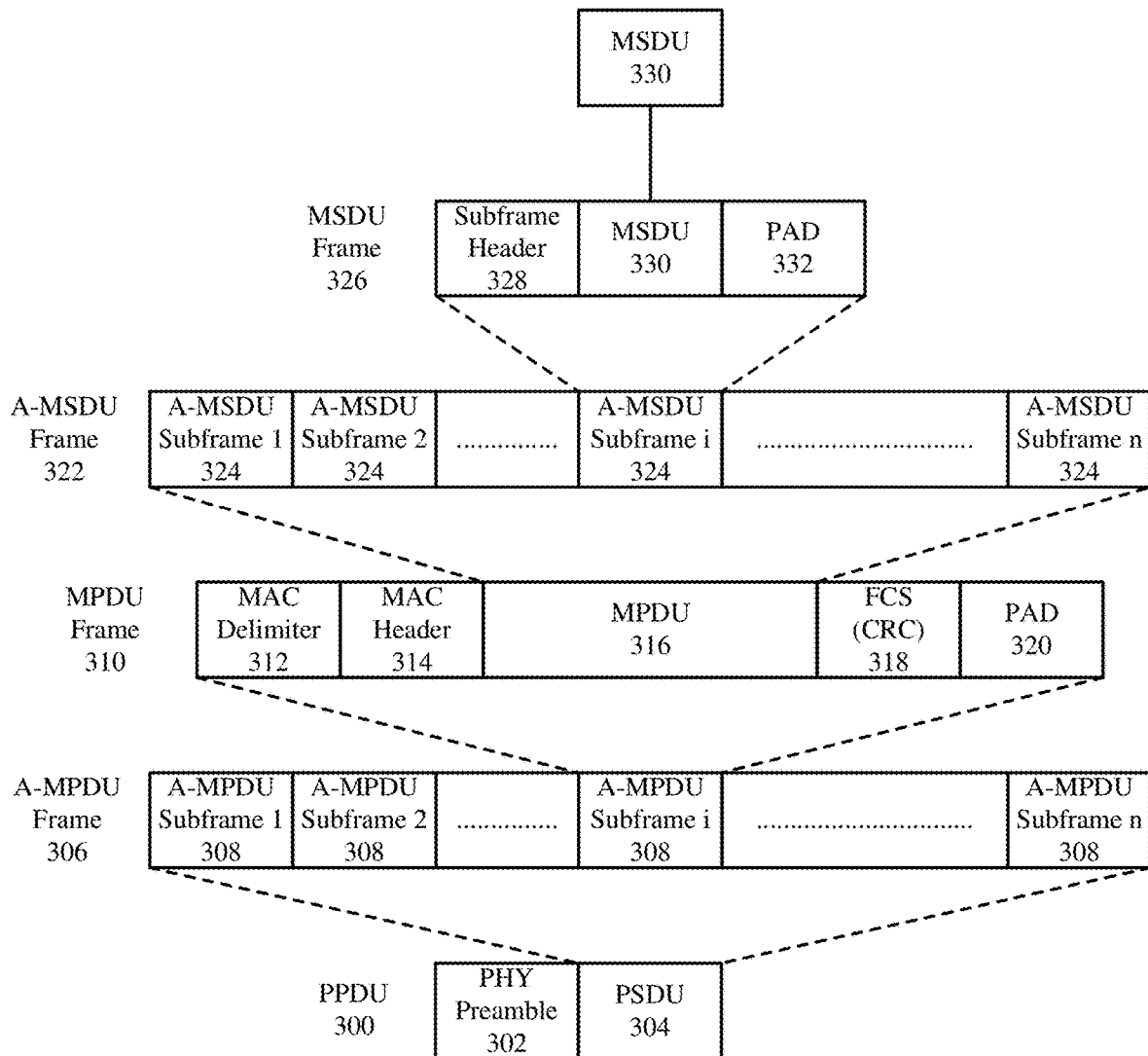
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
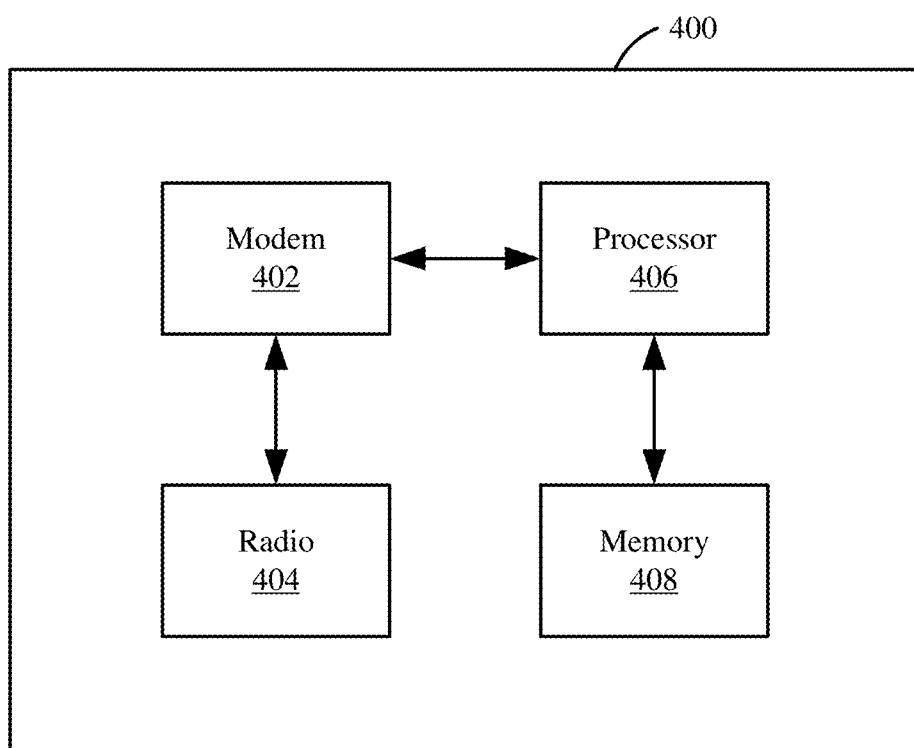
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas.

Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
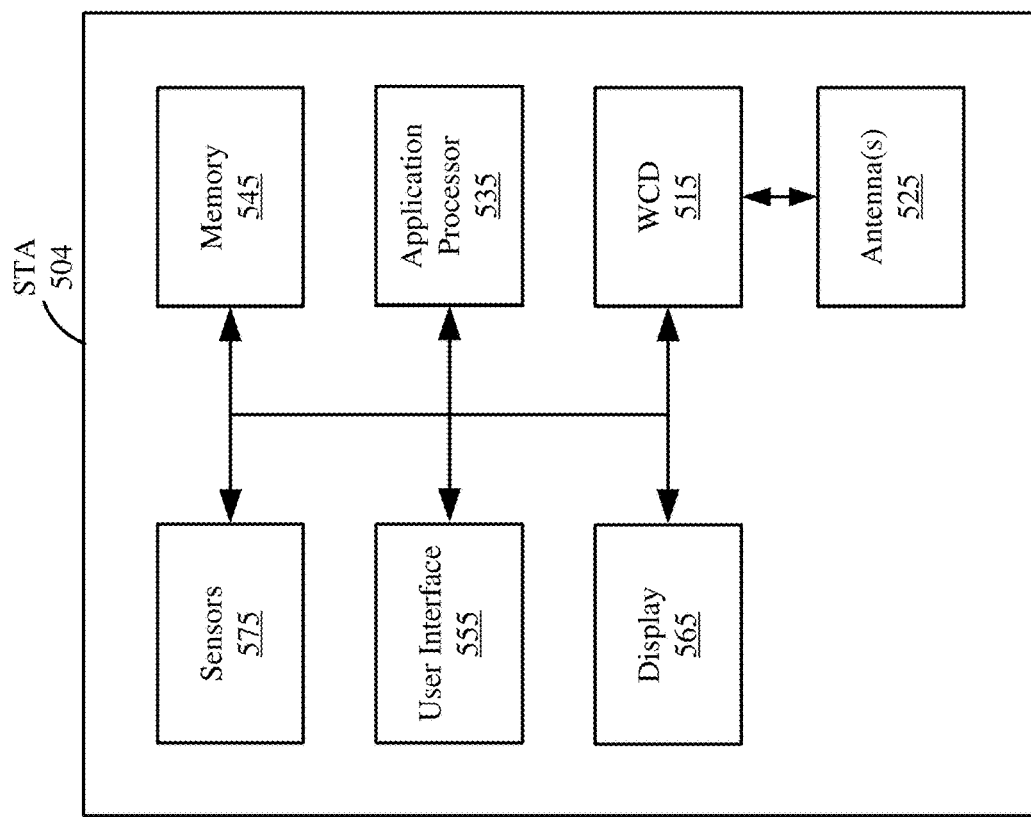
FIG. 5B shows a block diagram of an example STA.
Figure 5A:
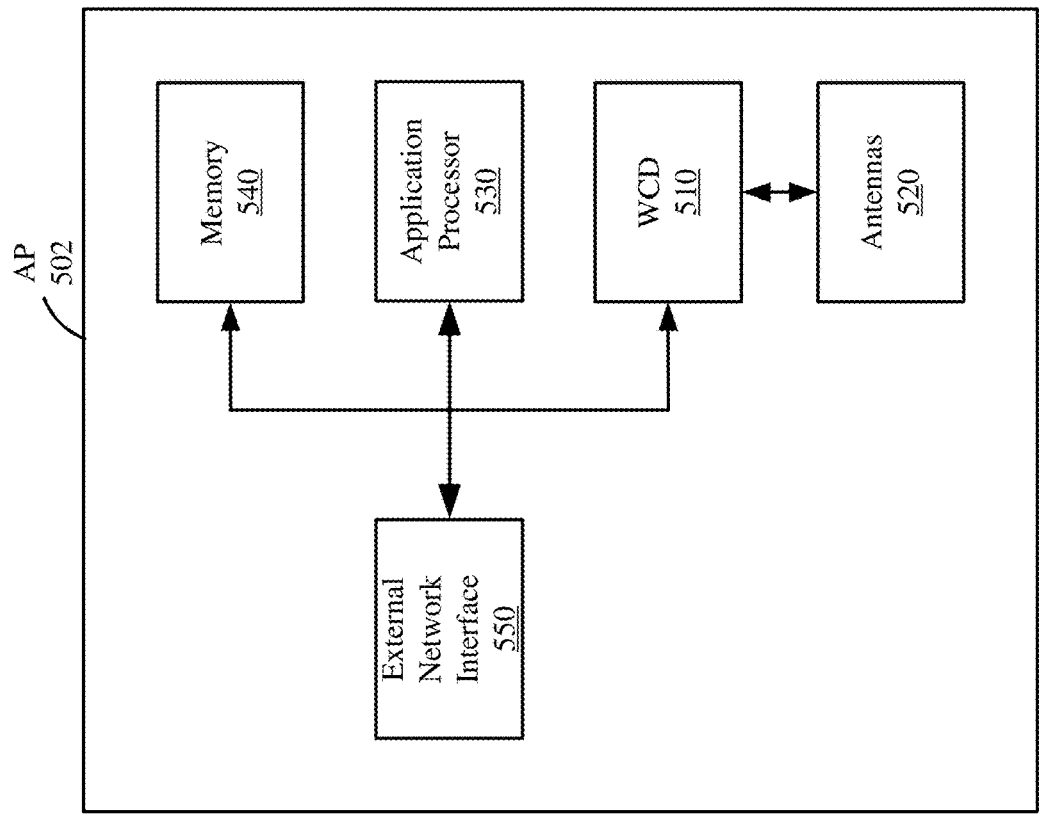
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, some APs and STAs may be subject to power spectral density (PSD) limits. For example, some APs and STAs that operate in the 6 GHz frequency band may be required to conform to a low power indoor (LPI) power class, which limits the transmit power of APs and STAs (in the 6 GHz band) to 5 dBm/MHz and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

Various aspects relate generally to increasing the transmit power of wireless communication devices operating on PSD-limited wireless channels, and more particularly, to PPDU designs that support distributed transmission. As used herein, the term "distributed transmission" refers to the transmission of at least a portion of a PPDU on noncontiguous tones (or subcarriers) spanning a wireless channel. In contrast, the term "contiguous transmission" refers to the transmission of at least a portion of a PPDU on one or more sets of contiguous tones that represent one or more RUs, respectively, as defined by existing versions of the IEEE 802.11 standard. In some implementations, a wireless communication device may generate a PPDU based directly on one or more legacy tone plans. In such implementations, the wireless communication device may modulate a portion of the PPDU on a number (M) of tones representing a logical RU associated with the one or more legacy tone plans and may further map the M tones to M noncontiguous subcarrier indices associated with a wireless channel in accordance with a distributed tone plan. In some other implementations, a wireless communication device may generate a PPDU based on a distributed tone plan. In such implementations, the wireless communication device may modulate a portion of the PPDU on a number (M) of tones coinciding with M noncontiguous subcarrier indices associated with a wireless channel in accordance with the distributed tone plan.

Particular implementations of the subject matter described in this disclosure can be implemented to realize one or more of the following potential advantages. Distributed transmission provides greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, aspects of the present disclosure may increase the overall transmit power of the PPDU without exceeding the PSD limits of the wireless channel. For example, the distributed tone plan may reduce the total number of tones modulated by the device on any 1-MHz subchannel of the wireless channel. As a result, the wireless communication device may increase its per-tone transmit power without exceeding the PSD limits. Further, distributed transmissions by multiple wireless communication devices can be multiplexed onto a shared wireless channel thus increasing the transmit power of each device without sacrificing spectral efficiency. Such increases in transmit power can be combined with any modulation and coding scheme (MCS) to increase the range and throughput of wireless communications on PSD-limited wireless channels. Distributed transmissions also may improve the packet detection and channel estimation capabilities of the wireless communication devices.

Figure 6:
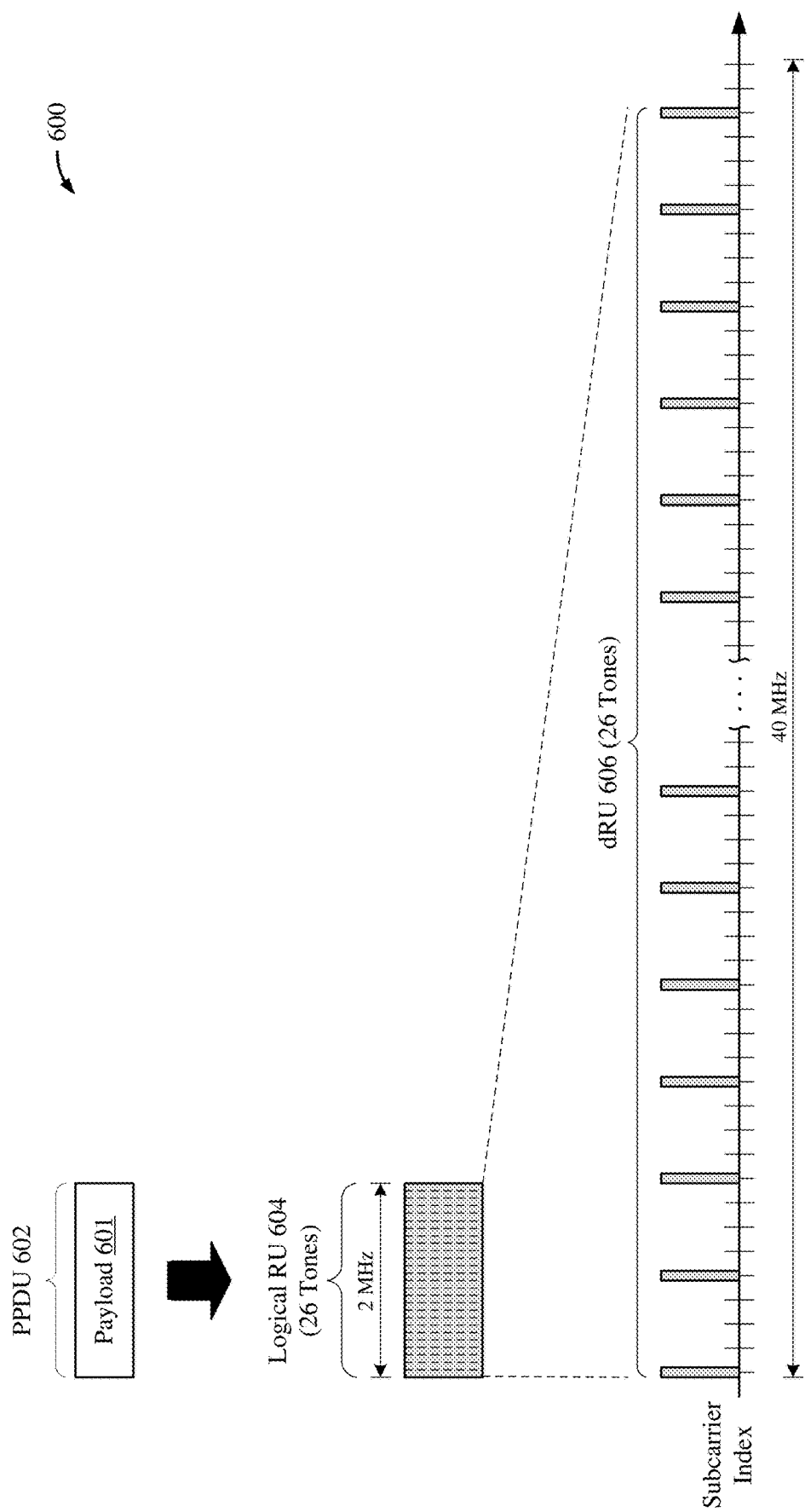
FIG. 6 shows a frequency diagram depicting an example distributed tone mapping according to some implementations.

FIG. 6 shows a frequency diagram 600 depicting an example distributed tone mapping according to some implementations. More specifically, FIG. 6 shows an example mapping of a payload 601 of a PPDU 602 to a set of tones or subcarriers for transmission over a wireless channel. In some implementations, the payload 601 may be modulated on a logical RU 604 associated with a legacy tone plan and further mapped to a distributed RU (dRU) 606 in accordance with a distributed tone plan. The logical RU 604 represents a number of tones or subcarriers that are allocated for the transmission of the PPDU 602. In contrast, the dRU 606 represents the physical resources (identified by subcarrier indices) that are modulated to transmit the PPDU 602. As used herein, the term "distributed RU" (or dRU) refers to any logical RU that is distributed across a set of noncontiguous subcarrier indices, and the term "distributed tone plan" refers to the set of noncontiguous subcarrier indices associated with a dRU.

Existing versions of the IEEE 802.11 standard define a number of RUs and multiple RUs (MRUs) of various sizes that map to contiguous tones or subcarriers spanning a frequency bandwidth (or wireless channel). For example, a 242-tone RU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As used herein, the term "regular RU" (or rRU) refers to any RU or MRU configuration that is supported by existing versions of the IEEE 802.11 standard (including the IEEE 802.11be amendment of the IEEE 802.11 standard), and the term "legacy tone plan" refers to any tone plan defined by existing versions of the IEEE 802.11 standard.

In some implementations, the logical RU 604 may represent an rRU as defined by existing versions of the IEEE 802.11 standard. In other words, the logical RU 604 maps directly to a respective rRU according to a legacy tone plan.

In the example of FIG. 6, the logical RU 604 includes 26 tones. Thus, under the legacy tone plan, the logical RU 604 would map directly to 26 contiguous or consecutive subcarrier indices spanning a 2 MHz subchannel. However, when mapped to an rRU, the transmit power of the logical RU 604 may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 604 is limited by the number of tones mapped to each 1 MHz subchannel of the wireless channel. Accordingly, each 1 MHz subchannel of a PSD-limited channel may be referred to herein as a "PSD-limited subchannel."

Aspects of the present disclosure recognize that the per-tone transmit power of the logical RU 604 can be increased by distributing the tones across a wider bandwidth. Increasing the per-tone transmit power can also increase the overall transmit power of the logical RU 604. Thus, in some implementations, the logical RU 604 may be mapped to a set of noncontiguous subcarrier indices spanning a wider-bandwidth channel. With reference for example to FIG. 6, the logical RU 604 is mapped to the dRU 606 according to a distributed tone plan. More specifically, the logical RU 604 is mapped to 26 noncontiguous subcarrier indices spread across a 40 MHz wireless channel (also referred to herein as a "dRU spreading bandwidth"). Compared to the tone mapping described above with respect to the legacy tone plan, the distributed tone mapping depicted in FIG. 6 effectively reduces the number of tones (of the logical RU 604) in each 1 MHz subchannel. For example, each of the 26 tones can be mapped to a different 1 MHz subchannel of the 40 MHz channel. As a result, each AP or STA implementing the distributed tone mapping of FIG. 6 can maximize its per-tone transmit power (which may maximize the overall transmit power of the logical RU 604).

In some implementations, a transmitting device (such as a STA or an AP) may include a distributed tone mapper that maps the logical RU 604 to the dRU 606 in the frequency domain (such as described with reference to FIG. 6). The dRU 606 is then converted to a time-domain signal (such as by an inverse fast Fourier transform (IFFT)) for transmission over a wireless channel. A receiving device (such as an AP or a STA) receives the time-domain signal over the wireless channel and converts the time-domain signal back to the dRU 606 (such as by a fast Fourier transform (FFT)). In some implementations, the receiving device may include a distributed tone demapper that demaps the dRU 606 to the logical RU 604. In other words, the distributed tone demapper reverses the mapping performed by the distributed tone mapper at the transmitting device. The receiving device can then recover the information carried (or modulated) on the logical RU 604 as a result of the demapping.

In the example of FIG. 6, the logical RU 604 is distributed evenly across a 40 MHz wireless channel. However, in actual implementations, the logical RU 604 can be mapped to any suitable pattern of noncontiguous subcarrier indices. For example, in some aspects, the distance between any pair of modulated tones may be less than or greater than the distances depicted in FIG. 6. Still further, in some aspects, multiple logical RUs may be mapped to interleaved subcarrier indices of a shared wireless channel.

Figure 7:
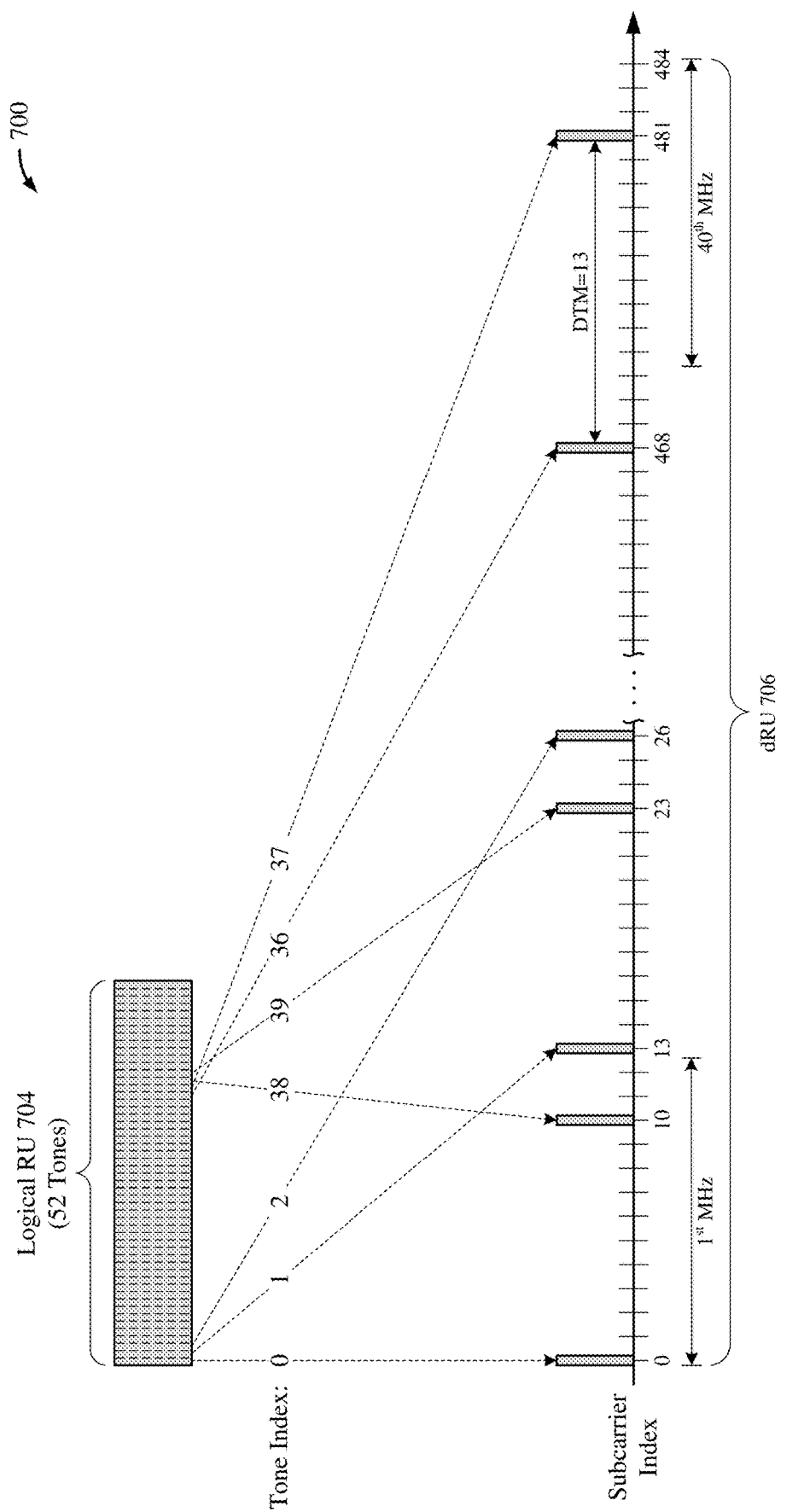
FIG. 7 shows a frequency diagram depicting an example mapping of a logical resource unit (RU) to a distributed RU (dRU) according to some implementations.

FIG. 7 shows a frequency diagram depicting an example mapping of a logical RU 704 to a dRU 706 according to some implementations. In the example of FIG. 7, the logical RU 704 includes 52 tones and the dRU spreading bandwidth is equal to 40 MHz. In some implementations, the 52 tones associated with the logical RU 704 may be mapped to 52 noncontiguous subcarrier indices associated with the 40 MHz channel in accordance with a distributed tone plan that maps the tone indices (tone_idx) of the 52 tones to respective subcarrier indices (SC_idx) based on a tone-mapping distance (DTM) and the number of usable tones in the spreading bandwidth ($N_{tones}$):

$$SC\_idx = mod(tone\_idx * DTM, N_{tones})$$

In the example of FIG. 7, DTM is equal to 13. As such, the distributed tone plan maps the 52 tones to every $13^{th}$ subcarrier index of the 40 MHz channel in a wraparound fashion. For example, the first tone of the logical RU 704 (tone_idx=0) is mapped to subcarrier index 0, the second tone of the logical RU 704 (tone_idx=1) is mapped to subcarrier index 13, and the third tone of the logical RU 704 (tone_idx=2) is mapped to the subcarrier index 26. This process continues until the $38^{th}$ tone of the logical RU 704 (tone_idx=37) is mapped to subcarrier index 481. Because there are only 484 usable tones in a 40 MHz channel, the distributed tone plan wraps around to the beginning of the 40 MHz channel. As a result, the $39^{th}$ tone of the logical RU 704 (tone_idx=38) is mapped to subcarrier index 10 and the $40^{th}$ tone of the logical RU 704 (tone_idx=39) is mapped to subcarrier index 23.

As shown in FIG. 7, the distributed tone mapping results in an uneven distribution of tones across various 1 MHz subchannels of the 40 MHz channel. For example, the $1^{st}$ MHz subchannel includes two modulated tones of the logical RU 704 (coinciding with subcarrier indices 0 and 10) whereas $40^{th}$ MHz subchannel includes only one modulated tone of the logical RU 704 (coinciding with subcarrier index 481). In some implementations, the overall transmit power of a dRU may be distributed evenly (or equally) across the PSD-limited subchannels. In other words, an AP or STA may allocate the same amount of transmit power to each PSD-limited subchannel that includes one or more modulated tones. With reference for example to FIG. 7, the AP or STA may transmit up to its PSD limit on each 1 MHz subchannel. This allows the AP or STA to maximize the overall transmit power of the dRU. However, because there is an uneven distribution of tones across the PSD-limited subchannels, the per-tone transmit power of the dRU may vary. For example, the tone mapped to subcarrier index 481 may have a higher per-tone transmit power than any of the tones mapped to subcarrier indices 0 or 10.

In some other implementations, the overall transmit power of a dRU may be distributed evenly (or equally) across the modulated tones of the dRU. In other words, an AP or STA may allocate the same amount of transmit power to each modulated tone, irrespective of its location in the wireless channel. With reference for example to FIG. 7, the AP or STA may transmit all 52 tones associated with the dRU 706 at the same transmit power. However, because there is an uneven distribution of tones across the PSD-limited subchannels, the per-MHz transmit power of the dRU may again vary. For example, the overall transmit power in the $1^{st}$ MHz subchannel may be greater than the overall transmit power in the $40^{th}$ MHz subchannel. Moreover, the per-tone transmit power must be determined so as not to exceed the PSD limit in any given subchannel.

Figure 8:
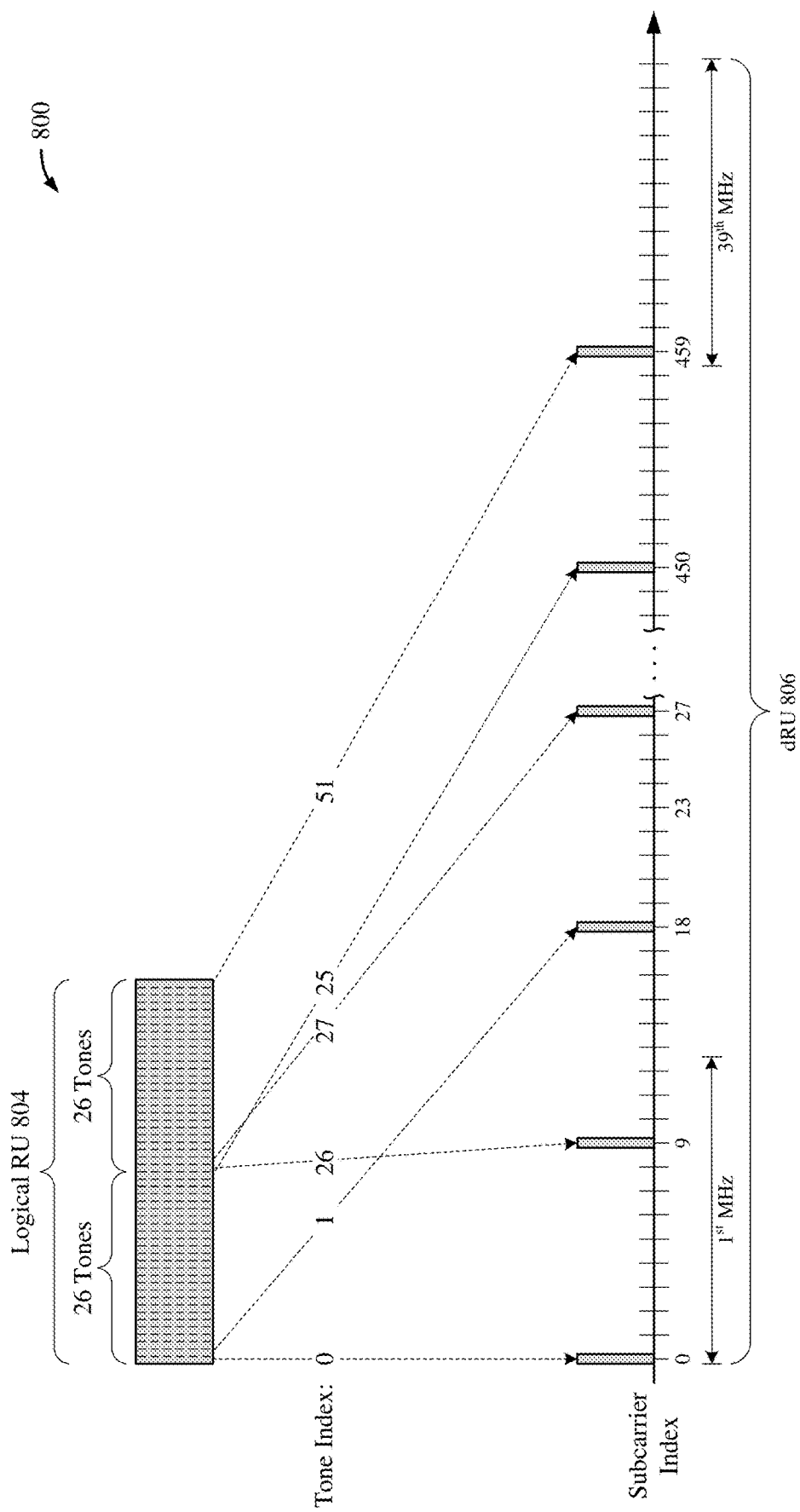
FIG. 8 shows a frequency diagram depicting another example mapping of a logical RU to a dRU according to some implementations.

FIG. 8 shows a frequency diagram depicting another example mapping of a logical RU 804 to a dRU 806 according to some implementations. In the example of FIG. 8, the logical RU 804 includes 52 tones and the dRU spreading bandwidth is equal to 40 MHz. In some implementations, the 52 tones associated with the logical RU 804 may be mapped to 52 noncontiguous subcarrier indices associated with the 40 MHz channel in accordance with a distributed tone plan that maps the first 26 tones of the logical RU 804 to every $18^{th}$ subcarrier index starting at subcarrier index 0 and maps the remaining 26 tones of the logical RU 804 to every $18^{th}$ subcarrier index starting at subcarrier index 9. In other words, the 52-tone logical RU 804 is treated as two 26-tone RUs for purposes of the distributed tone mapping.

In the example of FIG. 8, the first tone of the logical RU 804 (tone_idx=0) is mapped to subcarrier index 0 and the second tone of the logical RU 804 (tone_idx=1) is mapped to subcarrier index 18. This process continues until the $26^{th}$ tone of the logical RU 804 (tone_idx=25) is mapped to subcarrier index 450. After the first 26 tones of the logical RU 804 have been mapped to the dRU 806, the process is repeated for the next 26 tones of the logical RU 804 beginning with a subcarrier offset of 9. In other words, the $27^{th}$ tone of the logical RU 804 (tone_idx=26) is mapped to subcarrier index 9 and the $28^{th}$ tone of the logical RU 804 (tone_idx=27) is mapped to subcarrier index 27. This process continues until the $52^{nd}$ tone of the logical RU 804 (tone_idx=51) is mapped to subcarrier index 459.

As shown in FIG. 8, the modulated tones of the dRU 806 are equidistant to one another (separated by 9 subcarrier indices). However, this results in an uneven distribution of tones across various 1 MHz subchannels of the 40 MHz channel. For example, the $1^{st}$ MHz subchannel includes two modulated tones of the logical RU 804 (coinciding with subcarrier indices 0 and 9) whereas $39^{th}$ MHz subchannel includes only one modulated tone of the logical RU 704 (coinciding with subcarrier index 459). As described above, such uneven tone distribution may affect the transmit power level of the PPDU on a PSD-limited channel.

In some implementations, the overall transmit power of a dRU may be distributed evenly (or equally) across the PSD-limited subchannels. In other words, an AP or STA may allocate the same amount of transmit power to each PSD-limited subchannel that includes one or more modulated tones. With reference for example to FIG. 8, the AP or STA may transmit up to its PSD limit on each 1 MHz subchannel. This allows the AP or STA to maximize the overall transmit power of the dRU. However, because there is an uneven distribution of tones across the PSD-limited subchannels, the per-tone transmit power of the dRU may vary. For example, the tone mapped to subcarrier index 459 may have a higher per-tone transmit power than any of the tones mapped to subcarrier indices 0 or 9.

In some other implementations, the overall transmit power of a dRU may be distributed evenly (or equally) across the modulated tones of the dRU. In other words, an AP or STA may allocate the same amount of transmit power to each modulated tone, irrespective of its location in the wireless channel. With reference for example to FIG. 8, the AP or STA may transmit all 52 tones associated with the dRU 806 at the same transmit power. However, because there is an uneven distribution of tones across the PSD-limited subchannels, the per-MHz transmit power of the dRU may vary. For example, the overall transmit power in the $1^{st}$ MHz subchannel may be greater than the overall transmit power in the $39^{th}$ MHz subchannel. Moreover, the per-tone transmit power must be determined so as not to exceed the PSD limit in any given subchannel.

Figure 9A:
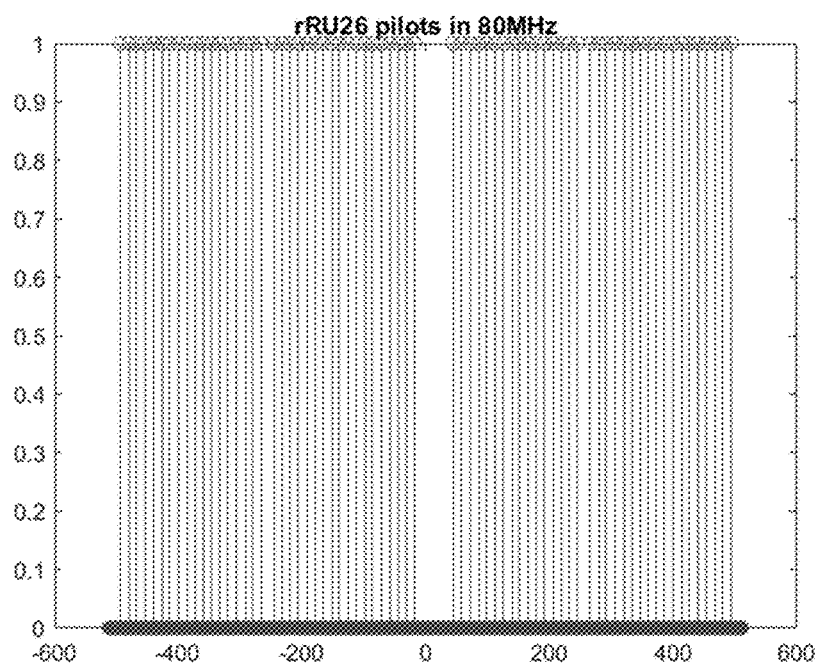
FIG. 9A shows a frequency diagram depicting an example mapping of pilot tones to a wireless channel in accordance with a legacy tone plan.
Figure 9B:
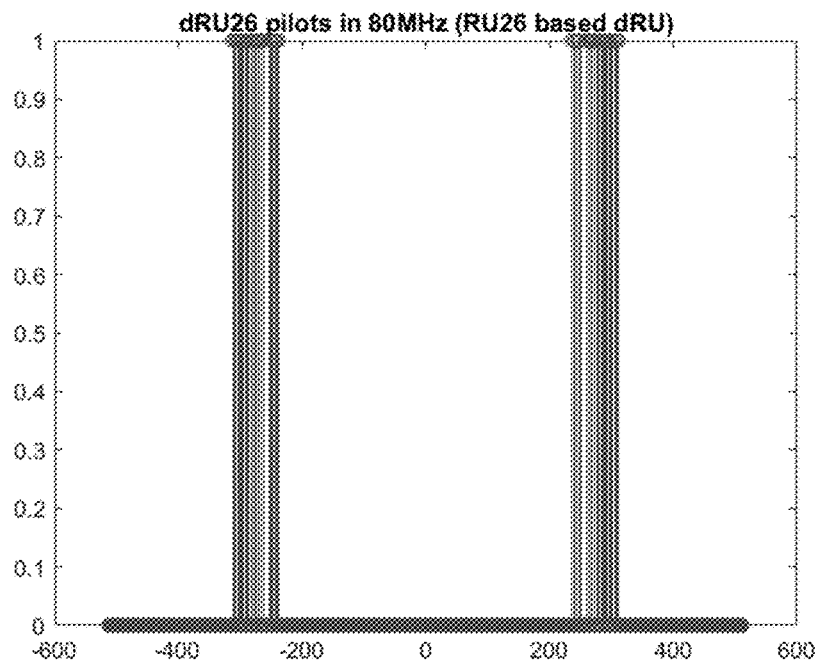
FIG. 9B shows a frequency diagram depicting an example mapping of pilot tones to a wireless channel in accordance with a distributed tone plan.

As shown in FIG. 8, the example distributed tone plan effectively interleaves two 26-tone RUs across the dRU spreading bandwidth. Aspects of the present disclosure recognize that such interleaving of RUs can change the distribution of pilot tones over the wireless channel. For example, FIG. 9A shows a frequency diagram 900 depicting an example mapping of pilot tones to a wireless channel in accordance with a legacy tone plan. More specifically, FIG. 9A shows the pilot tone locations associated with 26-tone rRUs distributed across an 80 MHz channel. As shown in FIG. 9A, the pilot tones are evenly distributed throughout the 80 MHz channel. In contrast, FIG. 9B shows a frequency diagram 910 depicting an example mapping of pilot tones to a wireless channel in accordance with a distributed tone plan. More specifically, FIG. 9B shows the pilot tone locations when existing 26-tone logical RUs are mapped to an 80 MHz channel in accordance with the distributed tone plan described above with reference to FIG. 8. As shown in FIG. 9B, the pilot tones are squeezed into two localized regions of the 80 MHz channel.

The pilot tones are used for phase alignment and parameter tracking. Aspects of the present disclosure recognize that, when the pilot tones are squeezed into localized regions of the wireless channel (such as shown in FIG. 9B), interference in such localized regions can effectively eliminate the pilot tones in the dRU 806. For example, a receiving device may not receive any of the pilot tones if it experiences a deep fade in the localized regions depicted in FIG. 9B. In some implementations, the pilot tones associated with a logical RU may be redistributed based on the distributed tone plan. In some aspects, the tone indices associated with the pilot tones may be altered in the logical RU 804. For example, the pilot tone locations in each 26-tone logical RU may be configured so that the pilot tones are substantially evenly distributed when mapped to a dRU 806. In some other aspects, an offset may be applied to the tone indices during the mapping of the logical RU 804 to the dRU 806. For example, each tone in the logical RU 804 may be mapped to the dRU 806 based on a tone mapping table that applies a respective tone index offset relative to its tone index, where the tone index offset is applied in a circular or wraparound fashion (such as described with reference to FIG. 7).

Aspects of the present disclosure further recognize that new packet designs are needed to support distributed transmissions. For example, existing versions of the IEEE 802.11 standard define a PPDU format that includes a PHY preamble followed by a payload. As described with reference to FIG. 6, the payload may be transmitted on a dRU to achieve increased in transmit power. Some portions of the PHY preamble must be transmitted on the same tones as the data payload (such as for channel estimation). However, some other portions of the PHY preamble must be duplicated over every 20 MHz subchannel of the wireless channel on which the PPDU is transmitted (such as for packet detection). Thus, in some implementations, at least a portion of the PPDU may be mapped to a series of noncontiguous tones in the dRU spreading bandwidth (in accordance with a distributed tone plan) and at least a portion of the PPDU may be mapped to a series of contiguous tones spanning the dRU spreading bandwidth (in accordance with a legacy tone plan).

Figure 10:
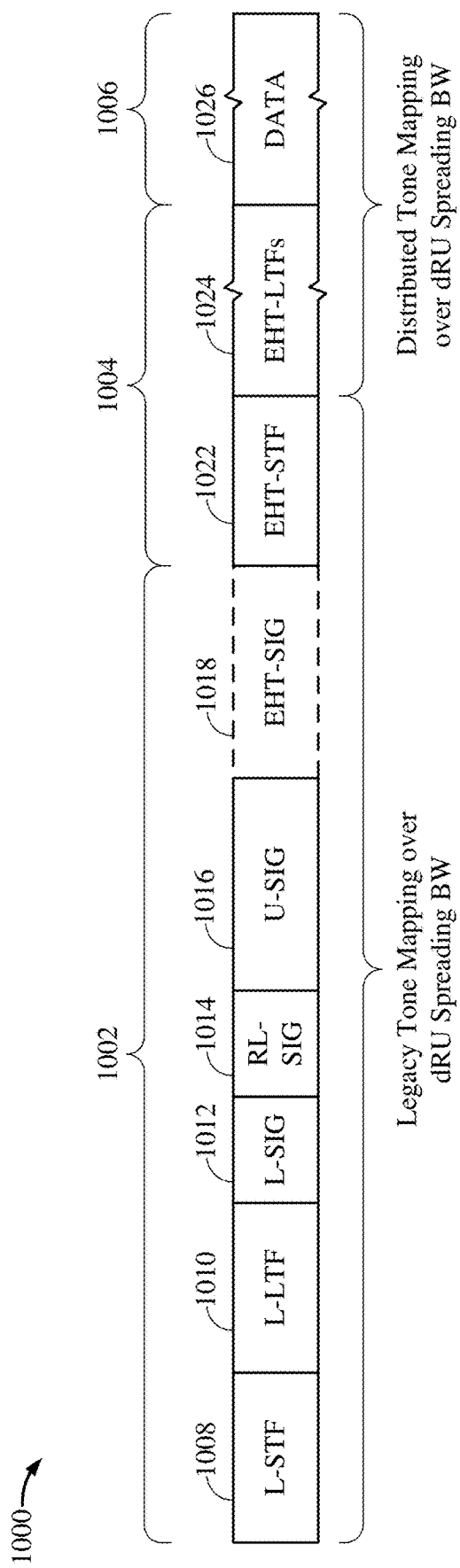
FIG. 10 shows an example PPDU usable for communications between a STA and an AP according to some implementations.

FIG. 10 shows an example PPDU 1000 usable for communications between a STA and an AP according to some implementations. In some implementations, the PPDU 1000 may be one example of the PPDU 602 of FIG. 6. The PPDU 1000 includes a PHY preamble including a first portion 1002 and a second portion 1004. The PPDU 1000 may further include a PHY payload 1006 after the preamble, for example, in the form of a PSDU carrying a DATA field 1026.

In some implementations, the PPDU 1000 may be formatted as a non-legacy or Extremely High Throughput (EHT) PPDU.

The first portion 1002 of the PHY preamble includes L-STF 1008, L-LTF 1010, L-SIG 1012, a repeated legacy signal field (RL-SIG) 1014, and a universal signal field (U-SIG) 1016. In some implementations, the first portion 1004 of the PHY preamble may further include a non-legacy signal field (EHT-SIG) 1018. With reference for example to the IEEE 802.11be amendment of the IEEE 802.11 standard, the first portion 1002 may be referred to as a "pre-EHT modulated portion" of the PHY preamble. The second portion 1004 of the PHY preamble includes a non-legacy short training field (EHT-STF) 1022 and a number of non-legacy long training fields (EHT-LTFs) 1024. With reference for example to the IEEE 802.11be amendment of the IEEE 802.11 standard, the second portion 1004 may be referred to as the "EHT modulated portion" of the PHY preamble.

With reference for example to FIG. 6, the PHY payload 1006 may be one example of the payload 601. The PHY payload 1006 may be modulated on a logical RU that is further mapped to a dRU, for example, to achieve gains in transmit power. As described with reference to FIGS. 6-8, the tones of the dRU are distributed across noncontiguous subcarrier indices associated with a wireless channel. The bandwidth of the wireless channel is referred to as the dRU spreading bandwidth. To achieve a noncontiguous tone distribution, the bandwidth of the logical RU on which the PHY payload 1006 is modulated must be smaller than the dRU spreading bandwidth. For example, as shown in FIG. 6, the payload 601 is modulated on a 26-tone logical RU 604 having a bandwidth of approximately 2 MHz, and the tones of the logical RU 604 are further distributed across 26 noncontiguous subcarrier indices associated with the 40 MHz dRU spreading bandwidth.

To ensure proper packet detection and backwards compatibility with wireless communication devices that conform to existing versions of the IEEE 802.11 standard, the first portion 1002 of the PHY preamble may be duplicated on every 20 MHz sub-band across the bandwidth of the PPDU 1000 (referred to herein as a "legacy 20 MHz tone plans"). Thus, in some implementations, the first portion 1002 of the PHY preamble may be mapped to a series of contiguous tones spanning the dRU spreading bandwidth in accordance with the legacy 20 MHz tone plans. In other words, the first portion 1002 of the PHY preamble may be modulated on a BW that the PHY payload 1006 is distributed over. With reference for example to FIG. 6, the dRU spreading bandwidth is 40 MHz encompasses. As such, the pre-EHT modulated portion of the PPDU 602 may be modulated on the 40 MHz dRU spreading bandwidth with the legacy tone plans.

In some implementations, the transmit power associated with the first portion 1002 of the PHY preamble may be determined based on the transmit power associated with the PHY payload 1006. More specifically, the overall transmit power distributed across the dRU spreading bandwidth remains the same for the transmission of the first portion 1002 of the PHY preamble and the transmission of the PHY payload 1006. For example, an AP or STA may determine the overall transmit power of the dRU based on the number of occupied PSD-limited subchannels (such as where the per-subchannel transmit power is constant) or based on the number of modulated tones (such as where the per-tone transmit power is constant). The AP or STA may further distribute the overall transmit power evenly across the contiguous tones spanning the dRU spreading bandwidth. As such, the per-tone transmit power associated with the first portion 1002 of the PHY preamble ($P_{Pre-EHT}$) can be expressed as a function of the total transmit power of the dRU ($P_{dRU}$) and the total number of tones in the dRU spreading bandwidth ($N_{tone}$):

$$P_{Pre-EHT} = \frac{P_{dRU}}{N_{tone}}$$

The EHT-STF 1022 carries a sequence of values (also referred to as an "STF sequence") that are used for automatic gain control (AGC) at the receiving device. As such, the EHT-STF 1022 also may be transmitted across the dRU spreading bandwidth. Existing versions of the IEEE 802.11 standard define an EHT-STF tone plan (also referred to as a "legacy EHT-STF tone plan") that maps the values of the STF sequence to respective tones associated with a wireless channel. More specifically, for a TB PPDU the legacy EHT-STF tone plan modulates every $8^{th}$ tone in the wireless channel with a respective STF value. In some implementations, the EHT-STF 1022 may be mapped to a series of tones spanning the dRU spreading bandwidth in accordance with a legacy EHT-STF tone plan. With reference for example to FIG. 6, the EHT-STF of the PPDU 602 may be modulated on every $8^{th}$ tone of the 484 tones (coinciding with every $8^{th}$ subcarrier index) spanning the 40 MHz dRU spreading bandwidth.

In some implementations, the transmit power associated with the EHT-STF 1022 may be determined based on the transmit power associated with the PHY payload 1006. More specifically, the overall transmit power distributed across the dRU spreading bandwidth remains the same for the transmission of the EHT-STF 1022 and the transmission of the PHY payload 1006. For example, an AP or STA may determine the overall transmit power of the dRU based on the number of occupied PSD-limited subchannels (such as where the per-subchannel transmit power is constant) or based on the number of modulated tones (such as where the per-tone transmit power is constant). The AP or STA may further distribute the overall transmit power evenly across the tones in the dRU spreading bandwidth that are modulated with STF values. As such, the per-tone transmit power associated with the EHT-STF 1022 ($P_{STF}$) can be expressed as function of the total transmit power of the dRU ($P_{dRU}$) and the total number of tones in the dRU spreading bandwidth that are modulated with STF values ($N_{STF}$):

$$P_{STF} = \frac{P_{dRU}}{N_{STF}}$$

The EHT-LTFs 1024 carry a sequence of values (also referred to as an "LTF sequence") that are used for channel estimation at the receiving device. As such, the EHT-LTFs 1024 may be transmitted on the same subcarrier indices as the PHY payload 1006. Thus, in some implementations, the EHT-LTFs 1024 also may be mapped to the dRU used to transmit the PHY payload 1006 (such as described with reference to FIGS. 6-8). As such, the per-tone transmit power associated with the EHT-LTFs 1024 may be equal to the per-tone transmit power associated with the PHY payload 1006. Existing versions of the IEEE 802.11 standard define various LTF sequences that can be used for channel estimation. Each of the LTF sequences may be associated with a particular bandwidth. In some implementations, the LTF sequence may be determined based on the dRU spreading bandwidth, however, only a subset of the LTF values may be selected for transmission on the dRU. In some aspects, the selection of LTF values may depend on the location of the logical RU relative to the dRU spreading bandwidth. In some other aspects, the selection of the LTF values may depend on the locations of the modulated tones associated with the dRU.

Figure 11A:
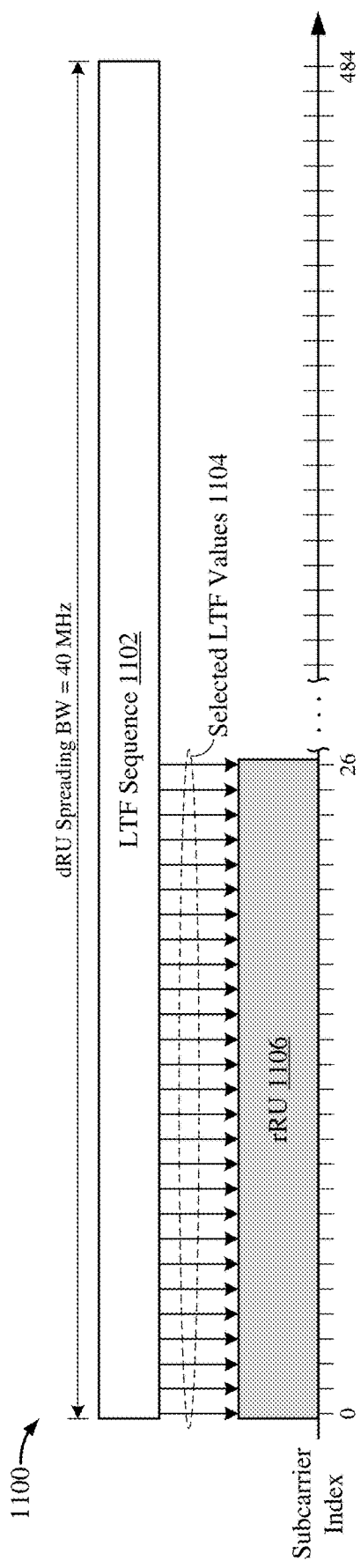
FIG. 11A shows a frequency diagram depicting an example operation for selecting a sequence of long training field (LTF) values to be mapped to a dRU according to some implementations.

FIG. 11A shows a frequency diagram 1100 depicting an example operation for selecting a sequence of LTF values to be mapped to a dRU according to some implementations. In some implementations, an LTF sequence 1102 is determined based on a dRU spreading bandwidth. In the example of FIG. 11A, the dRU spreading bandwidth is equal to 40 MHz. Thus, the LTF sequence 1102 may be an LTF sequence defined by existing versions of the IEEE 802.11 amendment for a 40 MHz bandwidth.

As described with reference to FIG. 10, the EHT-LTFs 1024 are transmitted on the same subcarrier indices as the PHY payload 1006. In other words, the EHT-LTFs 1024 are modulated on a number of tones associated with a logical RU which is further mapped to noncontiguous subcarrier indices associated with the dRU (such as described with reference to FIG. 6). Because the bandwidth of the logical RU is substantially smaller than the bandwidth of the dRU, only a subset of LTF values in the LTF sequence 1102 can be included in the EHT-LTFs 1024.

In some implementations, the subset of LTF values may be selected based on the location of the logical RU relative to the dRU spreading bandwidth. In the example of FIG. 11A, the logical RU represents the first 26 tones associated with the 40 MHz bandwidth. In other words, under a legacy tone plan, the logical RU would be mapped to 26 contiguous subcarrier indices (0-26) spanning a first rRU 1106 of the 40 MHz bandwidth. As such, the values of the LTF sequence 1102 that map to the rRU 1106 may be selected as the LTF values 1104 to be included in the EHT-LTFs 1024.

Figure 11B:
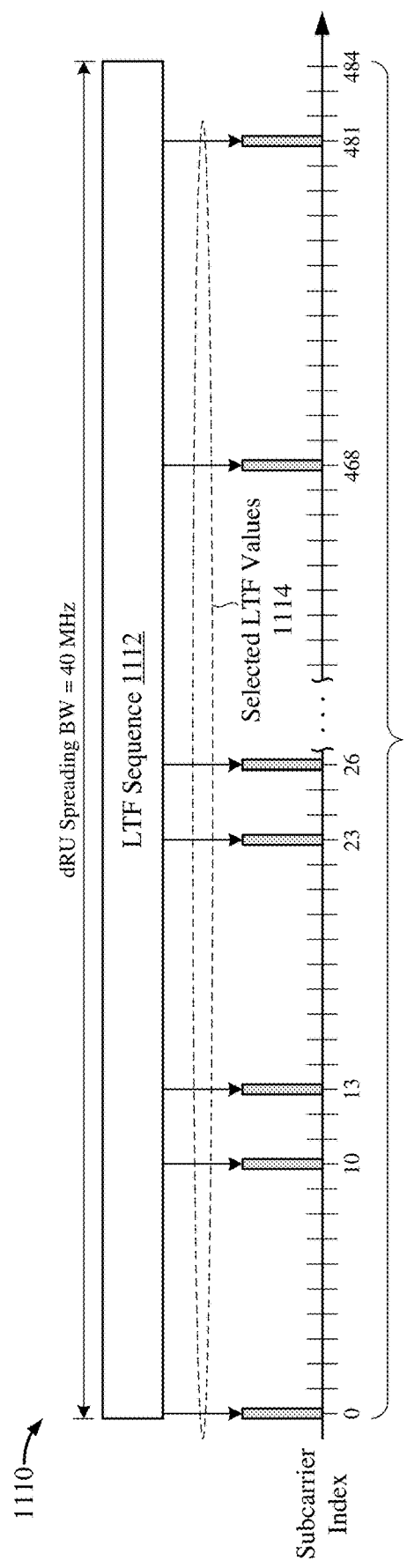
FIG. 11B shows a frequency diagram depicting another example operation for selecting a sequence of LTF values to be mapped to a dRU according to some implementations.

FIG. 11B shows a frequency diagram 1110 depicting another example operation for selecting a sequence of LTF values to be mapped to a dRU 1116 according to some implementations. In some implementations, an LTF sequence 1112 is determined based on a dRU spreading bandwidth. In the example of FIG. 11B, the dRU spreading bandwidth is equal to 40 MHz. Thus, the LTF sequence 1112 may be an LTF sequence defined by existing versions of the IEEE 802.11 amendment for a 40 MHz bandwidth.

As described with reference to FIG. 10, the EHT-LTFs 1024 are transmitted on the same subcarrier indices as the PHY payload 1006. In other words, the EHT-LTFs 1024 are modulated on a number of tones associated with a logical RU which is further mapped to noncontiguous subcarrier indices associated with the dRU (such as described with reference to FIG. 6). Because the bandwidth of the logical RU is substantially smaller than the bandwidth of the dRU, only a subset of LTF values in the LTF sequence 1112 can be included in the EHT-LTFs 1024.

In some implementations, the subset of LTF values may be selected based on the locations of the modulated tones of the dRU 1116. In the example of FIG. 11B, the logical RU maps to a set of noncontiguous subcarrier indices in accordance with a DTM-based distributed tone plan (DTM=13). In other words, every $13^{th}$ subcarrier index of the 40 MHz bandwidth is modulated with a respective LTF value, in a wraparound manner (such as described with reference to FIG. 7). As such, the values of the LTF sequence 1112 that map to the modulated tones of the dRU 1116 may be selected as the LTF values 1114 to be included in the EHT-LTFs 1024.

In some implementations, the PPDU 1000 may be transmitted over multiple spatial streams. In such implementations, a cyclic-shift delay (CSD) may be applied to one or more of the spatial streams. For example, a CSD is a phase offset that prevents or reduces the likelihood of unintentional combining (or beamforming) of the spatial streams at the receiving device. Unintentional beamforming may result from constructive (or destructive) interference of multiple spatial streams caused by multipath propagation. In some implementations, CSD may be applied to one or more of the spatial streams used to transmit the second portion 1004 of the PHY preamble (including the EHT-STF 1022 and the EHT-LTFs 1024) and the PHY payload 1006.

As described with reference to FIG. 10, the EHT-STF 1022 is mapped to a series of tones in accordance with a legacy EHT-STF tone plan. As such, CSD may be applied to the EHT-STF 1022 in the same manner as defined by existing versions of the IEEE 802.11 standard. In contrast, the EHT-LTFs 1024 and PHY payload 1006 are mapped to a dRU in accordance with a distributed tone plan. In some aspects, CSD may be applied to the EHT-LTFs 1024 and the PHY payload 1006 prior to the distributed tone mapping. In some other aspects, the CSD may be applied to the EHT-LTFs 1024 and the PHY payload 1006 after the distributed tone mapping.

FIG. 12A shows a block diagram of an example TX processing chain 1200 for a wireless communication device according to some implementations. More specifically, the TX processing chain 1200 may be configured to transmit a portion of a PPDU modulated on a logical RU 1202. In some implementation, the portion of the PPDU modulated on the logical RU 1202 may include one or more EHT-LTFs and a PHY payload (such as the EHT-LTFs 1024 and the PHY payload 1006, respectively, of FIG. 10).

The TX processing chain 1200 includes a stream parser 1201, a phase rotator 1203, a spatial stream (SS) mapper 1205, a dRU mapper 1207, and a number (n) of inverse fast Fourier transforms (IFFTs) 1209(1)-1209(n). The stream parser 1201 parses the information encoded on the logical RU 1201 into a number (n) of data streams to produce a multi-stream RU 1202'. The phase rotator 1203 is configured to apply CSD to one or more of the data streams of the multi-stream RU 1202' to produce a phase-rotated RU 1204. For example, the CSD may add phase rotations or offsets to the one or more data streams to prevent unintentional beamforming at the receiving device. The SS mapper 1205 maps the phase-rotated RU 1204 to n spatial streams to produce a spatially-mapped RU 1204'. For example, the SS mapper 1205 may apply a spatial mapping matrix to the modulation values modulated on the RU 1204. As a result of the spatial mapping, each of the data streams is projected on a respective transmitter chain (as the spatially-mapped RU 1204'). In some implementations, the spatial mapping matrix may be a Q matrix such as defined, for example, by existing versions of the IEEE 802.11 standard.

The dRU mapper 1207 further maps the spatially-mapped RU 1204' to a respective dRU 1206 on each of the n spatial streams. For example, the dRU mapper 1207 may perform any of the distributed tone mapping operations described above with reference to FIGS. 6-8. The IFFTs 1209(1)-1209(n) convert the dRU 1206 on the n spatial streams, respectively, from the frequency domain to the time domain. For example, each IFFT 1209 may produce a respective series of time-varying samples representative of the modulation values modulated on the dRU 1206. The time-varying samples represent a time-domain (TD) signal 1208 that can be transmitted, over a wireless channel, via n transmitter chains (not shown for simplicity).

FIG. 12B shows a block diagram of another example TX processing chain 1210 for a wireless communication device according to some implementations. More specifically, the TX processing chain 1210 may be configured to transmit a portion of a PPDU modulated on a logical RU 1211. In some implementation, the portion of the PPDU modulated on the logical RU 1211 may include one or more EHT-LTFs and a PHY payload (such as the EHT-LTFs 1024 and the PHY payload 1006, respectively, of FIG. 10).

The TX processing chain 1210 includes a stream parser 1211, a dRU mapper 1213, a phase rotator 1215, an SS mapper 127, and a number (n) of IFFTs 1219(1)-1219(n). The stream parser 1201 parses the information encoded on the logical RU 1212 into a number (n) of data streams to produce a multi-stream RU 1212'. The dRU mapper 1213 maps the data streams of the multi-stream RU 1212' to a respective dRU 1214 for each of the n data streams. For example, the dRU mapper 1213 may perform any of the distributed tone mapping operations described above with reference to FIGS. 6-8. The phase rotator 1215 is configured to apply CSD to one or more of the data streams associated with the dRU 1214 to produce a phase-rotated dRU 1216. For example, the CSD may add phase rotations or offsets to the one or more data streams to prevent unintentional beamforming at the receiving device.

The SS mapper 1217 maps the phase-rotated dRU 1216 to n spatial streams to produce a spatially-mapped dRU 1216'. For example, the SS mapper 1217 may apply a spatial mapping matrix to the modulation values modulated on the dRU 1216. As a result of the spatial mapping, each of the data streams is projected onto a respective transmitter chain (as the spatially-mapped dRU 1216'). In some implementations, the spatial mapping matrix may be a Q matrix such as defined, for example, by existing versions of the IEEE 802.11 standard. The IFFTs 1219(1)-1219(n) convert the spatially-mapped dRU 1216' from the frequency domain to the time domain. For example, each IFFT 1219 may produce a respective series of time-varying samples representative of the modulation values modulated on a respective spatial stream. The time-varying samples represent a TD signal 1218 that can be transmitted, over a wireless channel, via n transmitter chains (not shown for simplicity).

Figure 13:
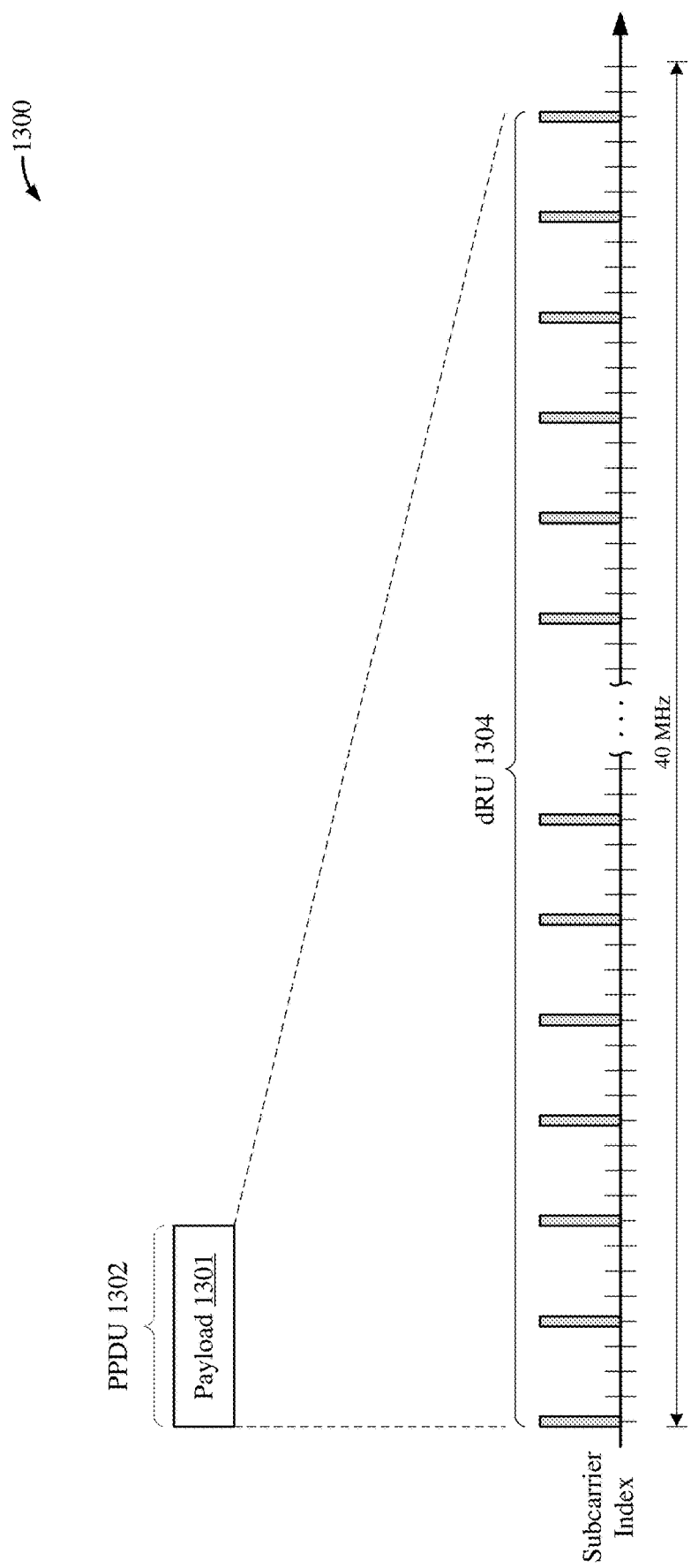
FIG. 13 shows a frequency diagram depicting another example distributed tone mapping according to some implementations.

FIG. 13 shows a frequency diagram 1300 depicting another example distributed tone mapping according to some implementations. More specifically, FIG. 13 shows an example mapping of a payload 1301 of a PPDU 1302 to a set of tones or subcarriers for transmission over a wireless channel. In some implementations, the payload 1301 may be modulated on a number of tones coinciding with noncontiguous subcarrier indices spanning a dRU 1304 in accordance with a distributed tone plan. In the example of FIG. 13, the tones of the dRU 1304 are evenly distributed across a 40 MHz channel.

In contrast with the distributed tone mapping of FIG. 6 (in which the payload 601 is first modulated on a logical RU 604 in accordance with a legacy tone plan and subsequently mapped to a dRU 606), the payload 1301 is modulated directly on the tones coinciding with the noncontiguous subcarrier indices of the dRU 1304. As such, the design of the PPDU 1302 may be optimized for distributed transmissions. For example, the PPDU may include new STF sequences, new LTF sequences, new pilot tone locations and sequences, and new CSD values that are designed specifically for distributed transmissions. In some implementations, the distributed tone plan used to map the payload PPDU 1302 to the dRU 1304 also may be different than any of the distributed tone plans described with reference to FIGS. 6-8. For example, because the distributed tone plan is not limited by the design of a logical RU (or rRU), the tones of the dRU 1304 may be distributed in a manner that is more optimized for distributed transmission of a particular wireless channel.

Figure 14:
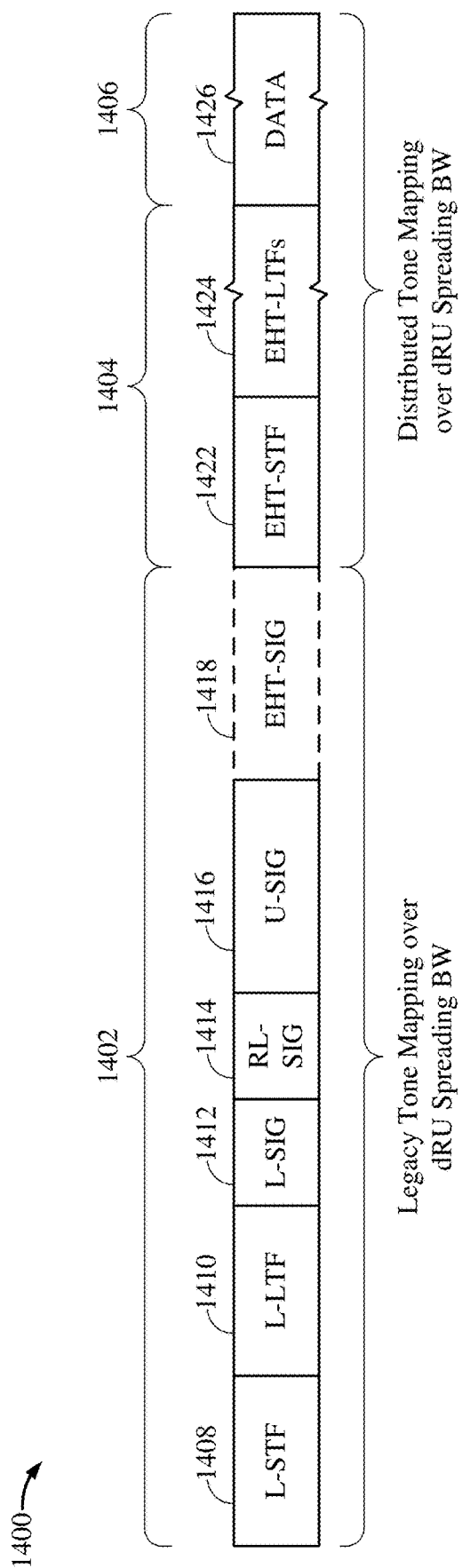
FIG. 14 shows another example PPDU usable for communications between a STA and an AP according to some implementations.

FIG. 14 shows another example PPDU 1400 usable for communications between a STA and an AP according to some implementations. In some implementations, the PPDU 1000 may be one example of the PPDU 1302 of FIG. 13. The PPDU 1400 includes a PHY preamble including a first portion 1402 and a second portion 1404. The PPDU 1400 may further include a PHY payload 1406 after the preamble, for example, in the form of a PSDU carrying a DATA field 1426. In some implementations, the PPDU 1400 may be formatted as a non-legacy or EHT PPDU.

The first portion 1402 of the PHY preamble includes L-STF 1408, L-LTF 1410, L-SIG 1412, an RL-SIG 1414, and a U-SIG 1416. In some implementations, the first portion 1404 of the PHY preamble may further include an EHT-SIG 1418. With reference for example to the IEEE 802.11be amendment of the IEEE 802.11 standard, the first portion 1402 may be referred to as a "pre-EHT modulated portion" of the PHY preamble. The second portion 1404 of the PHY preamble includes an EHT-STF 1422 and a number of EHT-LTFs 1424. With reference for example to the IEEE 802.11be amendment of the IEEE 802.11 standard, the second portion 1404 may be referred to as the "EHT modulated portion" of the PHY preamble.

With reference for example to FIG. 13, the PHY payload 1406 may be one example of the payload 1301. The PHY payload 1406 may be mapped to a dRU, for example, to achieve gains in transmit power. As described with reference to FIG. 13, the tones of the dRU are distributed across noncontiguous subcarrier indices associated with a wireless channel. The bandwidth of the wireless channel is referred to as the dRU spreading bandwidth. For example, as shown in FIG. 13, the payload 1301 is modulated on a number of tones coinciding with noncontiguous subcarrier indices associated with a 40 MHz dRU spreading bandwidth.

In some implementations, the first portion 1402 of the PHY preamble may be transmitted on a series of contiguous tones spanning the dRU spreading bandwidth in accordance with the legacy 20 MHz tone plan. In other words, the first portion 1402 of the PHY preamble may be modulated on a number of tones coinciding with contiguous subcarrier indices spanning the dRU spreading bandwidth. With reference for example to FIG. 13, the 40 MHz dRU spreading bandwidth encompasses 484 usable tones. As such, the pre-EHT modulated portion of the PPDU 1302 may be modulated on all 484 tones (coinciding with 484 contiguous subcarrier indices) spanning the 40 MHz dRU spreading bandwidth.

As described with reference to FIG. 10, the EHT-LTFs 1424 may be transmitted on the same subcarrier indices (or dRU) as the PHY payload 1006. In some implementations, the EHT-LTFs 1424 may carry a subset of LTF values associated with an LTF sequence defined by existing versions of the IEEE 802.11 standard. As described with reference to FIGS. 11A and 11B, the LTF sequence may be determined based on the dRU spreading bandwidth and the subset of LTF values may be selected based on the location of the logical RU or the locations of the noncontiguous tones of the dRU relative to the dRU spreading bandwidth. In some other implementations, the EHT-LTFs 1424 may carry a new LTF sequence that is optimized for transmission on the dRU. For example, each LTF value of the LTF sequence may be configured to be mapped to a respective tone of the dRU. As such, the new LTF sequence may be designed to reduce the peak-to-average power ratio (PAPR) associated with the transmission of the dRU.

In some implementations, the EHT-STF 1422 may be transmitted on a series of tones in accordance with a legacy EHT-STF tone plan. In such implementations, the EHT-STF 1422 may carry an STF sequence defined by existing versions of the IEEE 802.11 standard. In some other implementations, the EHT-STF 1422 may be modulated on the same subcarrier indices (or dRU) as the EHT-LTFs 1424 and PHY payload 1006. In such implementations, the EHT-STF 1422 may carry a new STF sequence that is optimized for transmission on the dRU. Aspects of the present disclosure recognize that the STF sequence has the same or similar design requirements as the LTF sequence (such as to minimize PAPR). Thus, in some implementations, the STF sequence may be the same as the LTF sequence carried in the EHT-LTFs 1422. In some aspects, the EHT-STF 1422 may have a fixed symbol duration and thus a cyclic prefix (CP) of fixed length.

Figure 15:
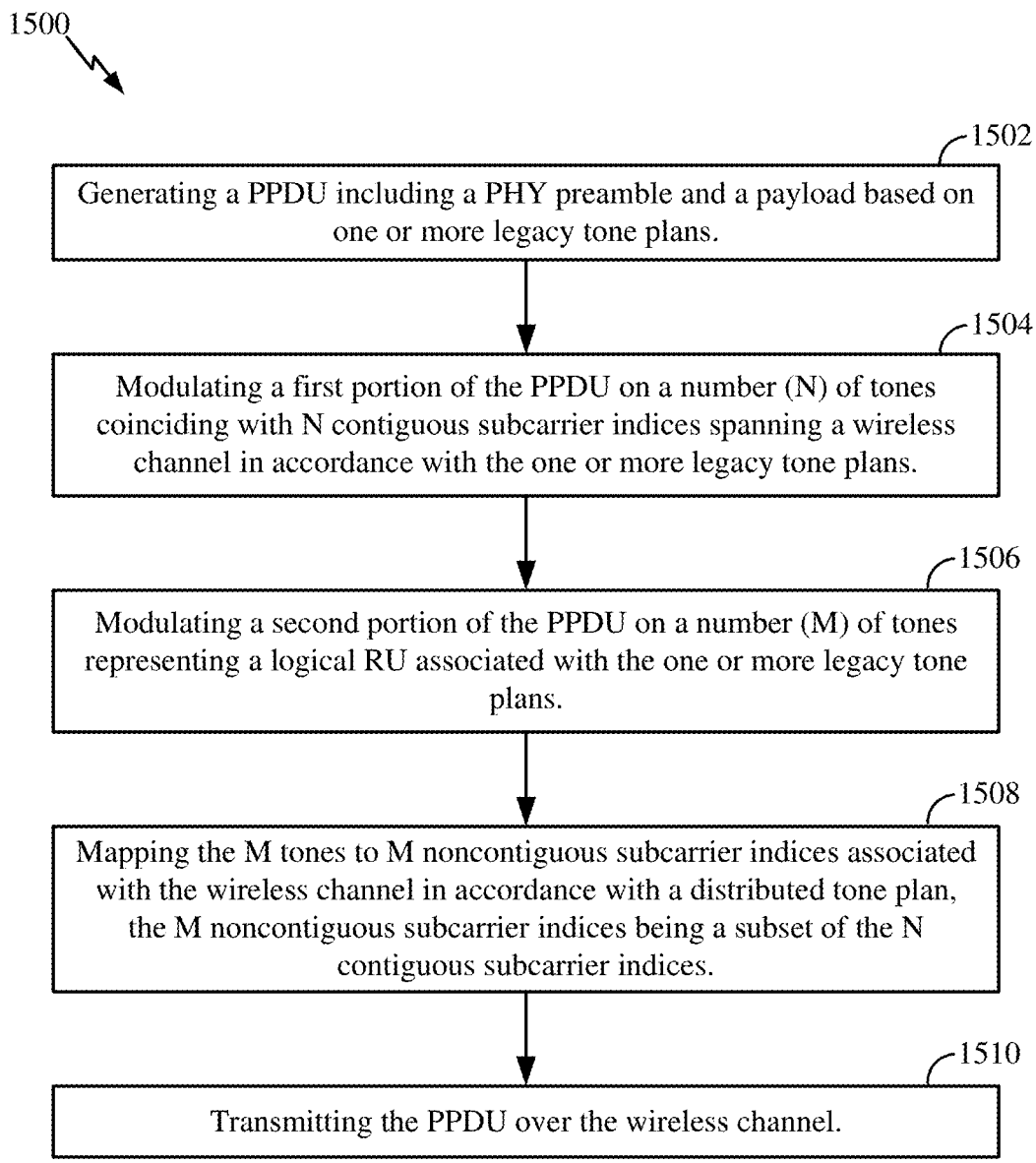
FIG. 15 shows a flowchart illustrating an example process for wireless communication that supports dRU transmission according to some implementations.

FIG. 15 shows a flowchart illustrating an example process 1500 for wireless communication that supports dRU transmission according to some implementations. In some implementations, the process 1500 may be performed by a wireless communication device operating as or within a network node, such as one of the STAs 104 or 504 described above with reference to FIGS. 1 and 5B, respectively.

In some implementations, the process 1500 begins in block 1502 with generating a PPDU including a PHY preamble and a payload based on one or more legacy tone plans. In block 1504, the process 1500 proceeds with modulating a first portion of the PPDU on a number (N) of tones coinciding with N contiguous subcarrier indices spanning a wireless channel in accordance with the one or more legacy tone plans. In block 1506, the process 1500 proceeds with modulating a second portion of the PPDU on a number (M) of tones representing a logical RU associated with the one or more legacy tone plans. In block 1508, the process 1500 proceeds with mapping the M tones to M noncontiguous subcarrier indices associated with the wireless channel in accordance with a distributed tone plan, the M noncontiguous subcarrier indices being a subset of the N contiguous subcarrier indices. In block 1510, the process 1500 proceeds with transmitting the PPDU over the wireless channel.

In some implementations, the first portion of the PPDU may include an L-STF, an L-LTF, an L-SIG, and a U-SIG of the PHY preamble. In some implementations, the first portion of the PPDU may further include a non-legacy signal field of the PHY preamble. In some implementations, the second portion of the PPDU may include the payload and a non-legacy LTF of the PHY preamble. In some implementations, a non-legacy STF of the PHY preamble may be modulated on a plurality of tones associated with the wireless channel in accordance with the one or more legacy tone plans, where the non-legacy STF is transmitted with the same transmit power as the second portion of the PPDU.

In some implementations, the generating of the PPDU in block 1502 may include determining a bandwidth of the wireless channel; determining a sequence of LTF values associated with the bandwidth of the wireless channel; and selecting a subset of the LTF values based on locations of the M noncontiguous subcarrier indices relative to the wireless channel, where the non-legacy LTF includes only the subset of LTF values. In some other implementations, the generating of the PPDU in block 1502 may include determining a bandwidth of the wireless channel; determining a sequence of LTF values associated with the bandwidth of the wireless channel; and selecting a subset of the LTF values based on a location of the logical RU relative to the bandwidth of the wireless channel, where the non-legacy LTF includes only the subset of LTF values.

In some implementations, the M noncontiguous subcarrier indices may coincide with a plurality of subchannels of the wireless channel that have the same bandwidth and PSD limit, where each of the plurality of subchannels includes one or more of the M noncontiguous subcarrier indices. In some implementations, the process 1500 may proceed with determining a transmit power associated with the transmission of the second portion of the PPDU based on the PSD limit, where the transmit power is evenly distributed across the M noncontiguous subcarrier indices. In some other implementations, the process 1500 may proceed with determining a transmit power associated with the transmission of the second portion of the PPDU based on the PSD limit, where the transmit power is evenly distributed across the plurality of subchannels.

In some implementations, the process 1500 may proceed with mapping the second portion of the PPDU to a plurality of spatial streams and applying a CSD to one or more spatial streams of the plurality of spatial streams prior to the mapping of the M tones to the M noncontiguous subcarrier indices. In some other implementations, the process 1500 may proceed with mapping the second portion of the PPDU to a plurality of spatial streams and applying a CSD to one or more spatial streams of the plurality of spatial streams after the mapping of the M tones to the M noncontiguous subcarrier indices.

Figure 16:
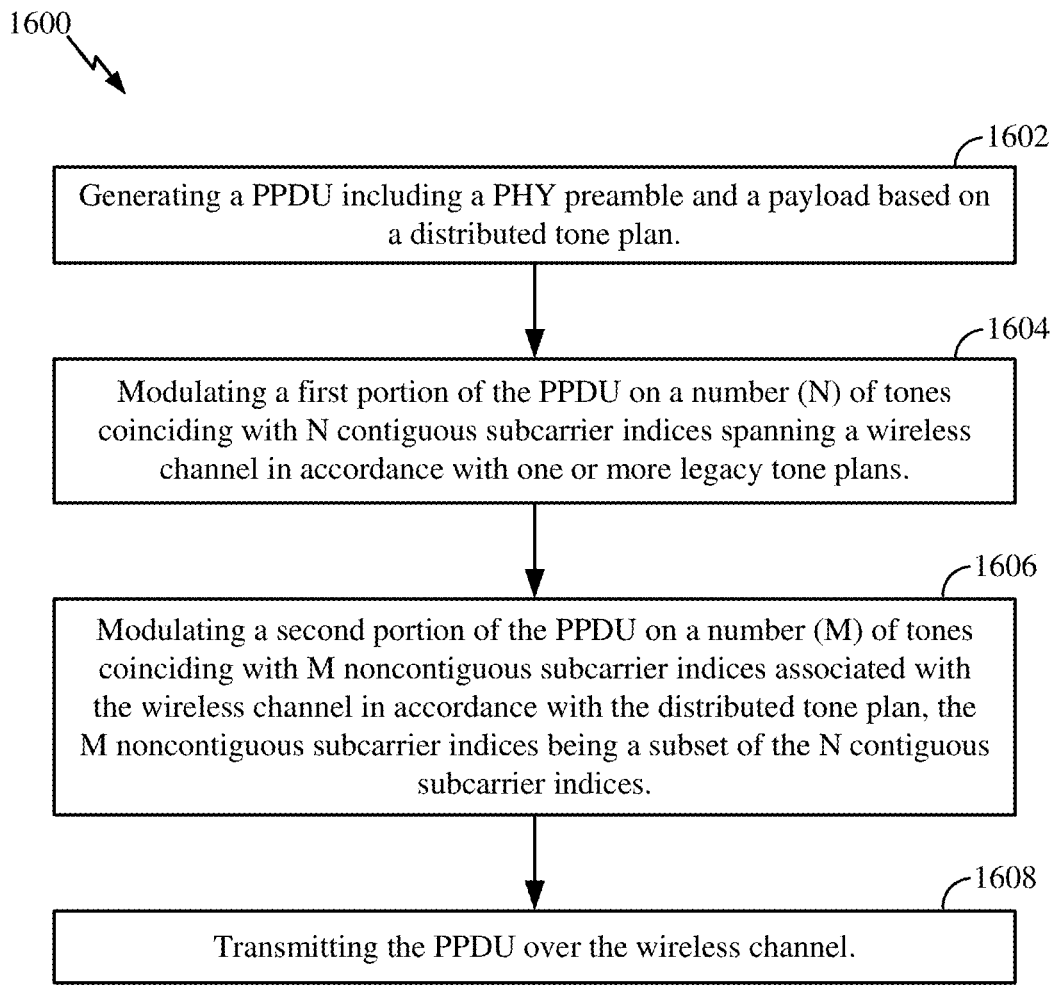
FIG. 16 shows a flowchart illustrating an example process for wireless communication that supports dRU transmission according to some implementations.

FIG. 16 shows a flowchart illustrating an example process 1600 for wireless communication that supports dRU transmission according to some implementations. In some implementations, the process 1600 may be performed by a wireless communication device operating as or within a network node, such as one of the STAs 104 or 504 described above with reference to FIGS. 1 and 5B, respectively.

In some implementations, the process 1600 begins in block 1602 with generating a PPDU including a PHY preamble and a payload based on a distributed tone plan. In block 1604, the process 1600 proceeds with modulating a first portion of the PPDU on a number (N) of tones coinciding with N contiguous subcarrier indices spanning a wireless channel in accordance with one or more legacy tone plans. In block 1606, the process 1600 proceeds with modulating a second portion of the PPDU on a number (M) of tones coinciding with M noncontiguous subcarrier indices associated with the wireless channel in accordance with the distributed tone plan, the M noncontiguous subcarrier indices being a subset of the N contiguous subcarrier indices. In block 1608, the process 1600 proceeds with transmitting the PPDU over the wireless channel.

In some implementations, the first portion of the PPDU may include an L-STF, an L-LTF, an L-SIG, and a U-SIG of the PHY preamble. In some implementations, the first portion of the PPDU may further include a non-legacy signal field of the PHY preamble. In some implementations, the second portion of the PPDU may include the payload and a non-legacy LTF of the PHY preamble.

In some implementations, the generating of the PPDU in block 1602 may include selecting a sequence of LTF values associated with the distributed tone plan, where the non-legacy LTF includes the sequence of LTF values. In some other implementations, the generating of the PPDU in block 1602 may include selecting a sequence of STF values associated with the distributed tone plan, where the non-legacy STF includes the sequence of STF values. In some implementations, the sequence of STF values may be equal to the sequence of LTF values.

In some implementations, the M noncontiguous subcarrier indices may coincide with a plurality of subchannels of the wireless channel that have the same bandwidth and PSD limit, where each of the plurality of subchannels includes one or more of the M noncontiguous subcarrier indices. In some implementations, the process 1500 may proceed with determining a transmit power associated with the transmission of the second portion of the PPDU based on the PSD limit, where the transmit power is evenly distributed across the M noncontiguous subcarrier indices. In some other implementations, the process 1500 may proceed with determining a transmit power associated with the transmission of the second portion of the PPDU based on the PSD limit, where the transmit power is evenly distributed across the plurality of subchannels.

Figure 17:
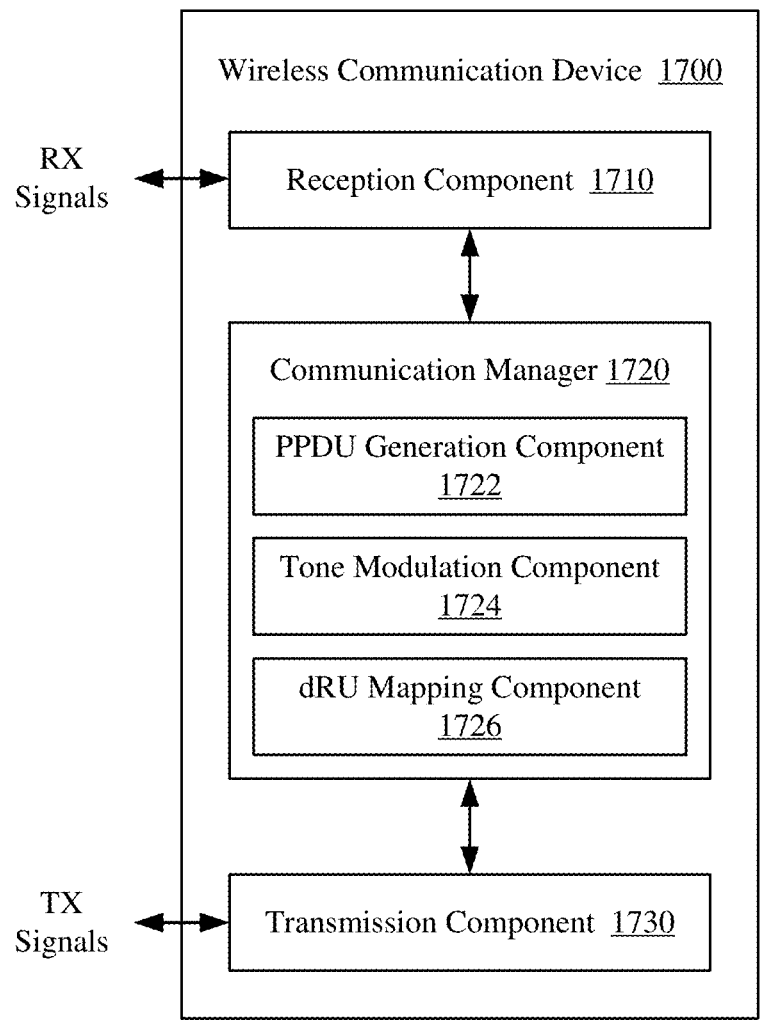
FIG. 17 shows a block diagram of an example wireless communication device according to some implementations.

FIG. 17 shows a block diagram of an example wireless communication device 1700 according to some implementations. In some implementations, the wireless communication device 1700 is configured to perform the process 1500 described above with reference to FIG. 15. The wireless communication device 1700 can be an example implementation of the wireless communication device 400 described above with reference to FIG. 4. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 further includes a PPDU generation component 1722, a tone modulation component 1724, and a dRU mapping component 1726. Portions of one or more of the components 1722, 1724, and 1726 may be implemented at least in part in hardware or firmware. In some implementations, at least some of the components 1722, 1724, or 1726 are implemented at least in part as software stored in a memory (such as the memory 508). For example, portions of one or more of the components 1722, 1724, and 1726 can be implemented as non-transitory instructions (or "code") executable by a processor (such as the processor 506) to perform the functions or operations of the respective component.

The reception component 1710 is configured to receive RX signals, over a wireless channel, from one or more other wireless communication devices. The communication manager 1720 is configured to control or manage communications with the one or more other wireless communication devices. In some implementations, the PPDU generation component 1722 may generate a PPDU including a PHY preamble and a payload based on one or more legacy tone plans; the tone modulation component 1724 may modulate a first portion of the PPDU on a number (N) of tones coinciding with N contiguous subcarrier indices spanning a wireless channel in accordance with the one or more legacy tone plans and modulate a second portion of the PPDU on a number (M) of tones representing a logical RU associated with the one or more legacy tone plans; and the dRU mapping component 1726 may map the M tones to M noncontiguous subcarrier indices associated with the wireless channel in accordance with a distributed tone plan, where the M noncontiguous subcarrier indices are a subset of the N contiguous subcarrier indices. The transmission component 1730 is configured to transmit TX signals, over the wireless channel, to one or more other wireless communication devices. In some implementations, the transmission component 1730 may transmit the PPDU over the wireless channel.

Figure 18:
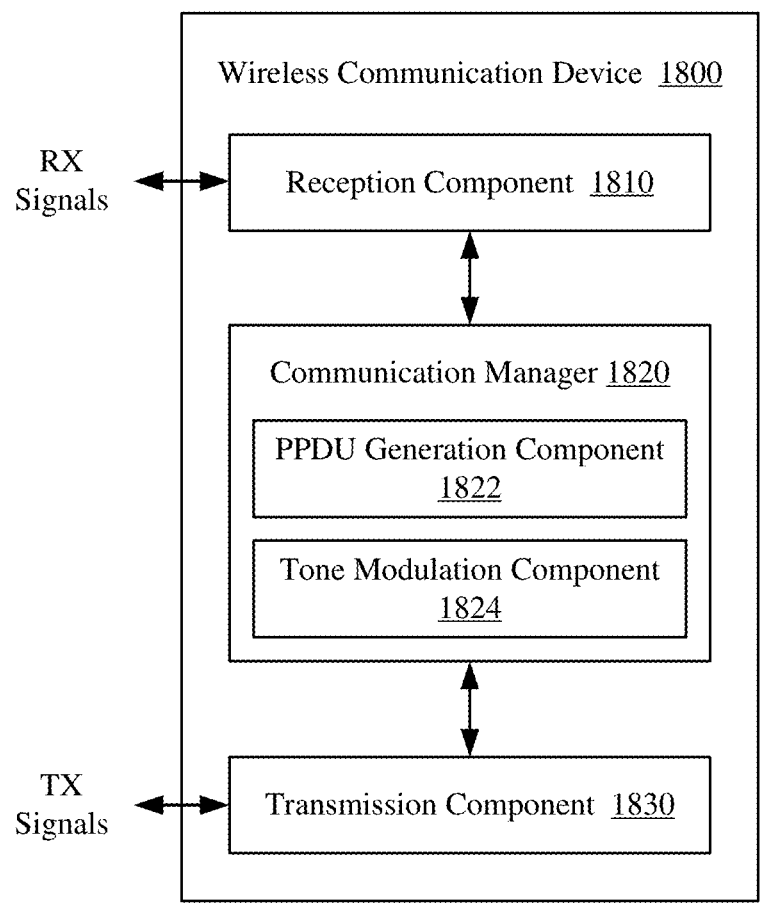
FIG. 18 shows a block diagram of an example wireless communication device according to some implementations.

FIG. 18 shows a block diagram of an example wireless communication device 1800 according to some implementations. In some implementations, the wireless communication device 1800 is configured to perform the process 1600 described above with reference to FIG. 16. The wireless communication device 1800 can be an example implementation of the wireless communication device 400 described above with reference to FIG. 4. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 further includes a PPDU generation component 1822 and a tone modulation component 1824. Portions of one or more of the components 1822 and 1824 may be implemented at least in part in hardware or firmware. In some implementations, at least some of the components 1822 or 1824 are implemented at least in part as software stored in a memory (such as the memory 508). For example, portions of one or more of the components 1822 and 1824 can be implemented as non-transitory instructions (or "code") executable by a processor (such as the processor 506) to perform the functions or operations of the respective component.

The reception component 1810 is configured to receive RX signals, over a wireless channel, from one or more other wireless communication devices. The communication manager 1820 is configured to control or manage communications with the one or more other wireless communication devices. In some implementations, the PPDU generation component 1822 may generate a PPDU including a PHY preamble and a payload based on a distributed tone plan; and the tone modulation component 1824 may modulate a first portion of the PPDU on a number (N) of tones coinciding with N contiguous subcarrier indices spanning a wireless channel in accordance with one or more legacy tone plans and may modulate a second portion of the PPDU on a number (M) of tones coinciding with M noncontiguous subcarrier indices associated with the wireless channel in accordance with the distributed tone plan, where the M noncontiguous subcarrier indices are a subset of the N contiguous subcarrier indices. The transmission component 1830 is configured to transmit TX signals, over the wireless channel, to one or more other wireless communication devices. In some implementations, the transmission component 1830 may transmit the PPDU over the wireless channel.

Implementation examples are described in the following numbered clauses:

1. A method for wireless communication by a wireless communication device, including:
   generating a physical layer (PHY) convergence protocol (PLCP) protocol data unit (PPDU) including a PHY preamble and a payload based on one or more legacy tone plans;
   modulating a first portion of the PPDU on a number (N) of tones coinciding with N contiguous subcarrier indices spanning a wireless channel in accordance with the one or more legacy tone plans;

modulating a second portion of the PPDU on a number (M) of tones representing a logical resource unit (RU) associated with the one or more legacy tone plans;

mapping the M tones to M noncontiguous subcarrier indices associated with the wireless channel in accordance with a distributed tone plan, the M noncontiguous subcarrier indices being a subset of the N contiguous subcarrier indices; and transmitting the PPDU over the wireless channel.

2. The method of clause 1, where the first portion of the PPDU includes a legacy short training field (L-STF), a legacy long training field (L-LTF), a legacy signal field (L-SIG), and a universal signal field (U-SIG) of the PHY preamble.

3. The method of any of clauses 1 or 2, where the first portion of the PPDU further includes a non-legacy signal field of the PHY preamble.

4. The method of any of clauses 1-3, where the second portion of the PPDU includes the payload and a non-legacy long training field (LTF) of the PHY preamble.

5. The method of any of clauses 1-4, where the generating of the PPDU includes:

determining a bandwidth of the wireless channel;

determining a sequence of LTF values associated with the bandwidth of the wireless channel; and selecting a subset of the LTF values based on locations of the M noncontiguous subcarrier indices relative to the wireless channel, the non-legacy LTF including only the subset of LTF values.

6. The method of any of clauses 1-4, where the generating of the PPDU includes:

determining a bandwidth of the wireless channel;

determining a sequence of LTF values associated with the bandwidth of the wireless channel; and selecting a subset of the LTF values based on a location of the logical RU relative to the bandwidth of the wireless channel, the non-legacy LTF including only the subset of LTF values.

7. The method of any of clauses 1-6, where the M noncontiguous subcarrier indices coincide with a plurality of subchannels of the wireless channel that have the same bandwidth and power spectral density (PSD) limit, each of the plurality of subchannels including one or more of the M noncontiguous subcarrier indices.

8. The method of any of clauses 1-7, further including:

determining a transmit power associated with the transmission of the second portion of the PPDU based on the PSD limit, the transmit power being evenly distributed across the M noncontiguous subcarrier indices.

9. The method of any of clauses 1-7, further including:

determining a transmit power associated with the transmission of the second portion of the PPDU based on the PSD limit, the transmit power being evenly distributed across the plurality of subchannels.

10. The method of any of clauses 1-9, further including:

modulating a non-legacy short training field (STF) of the PHY preamble on a plurality of tones associated with the wireless channel in accordance with the one or more legacy tone plans, the non-legacy STF being transmitted with the same transmit power as the second portion of the PPDU.

11. The method of any of clauses 1-10, further including:

mapping the second portion of the PPDU to a plurality of spatial streams; and applying a cyclic-shift delay (CSD) to one or more spatial streams of the plurality of spatial streams prior to the mapping of the M tones to the M noncontiguous subcarrier indices.

12. The method of any of clauses 1-10, further including:

mapping the second portion of the PPDU to a plurality of spatial streams; and applying a CSD to one or more spatial streams of the plurality of spatial streams after the mapping of the M tones to the M noncontiguous subcarrier indices.

13. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to perform the method of any one or more of clauses 1-12.

14. A method for wireless communication performed by a wireless communication device, including:

generating a physical layer (PHY) convergence protocol (PLCP) protocol data unit (PPDU) including a PHY preamble and a payload based on a distributed tone plan;

modulating a first portion of the PPDU on a number (N) of tones coinciding with N contiguous subcarrier indices spanning a wireless channel in accordance with one or more legacy tone plans;

modulating a second portion of the PPDU on a number (M) of tones coinciding with M noncontiguous subcarrier indices associated with the wireless channel in accordance with the distributed tone plan, the M noncontiguous subcarrier indices being a subset of the N contiguous subcarrier indices; and transmitting the PPDU over the wireless channel.

15. The method of clause 14, where the first portion of the PPDU includes a legacy short training field (L-STF), a legacy long training field (L-LTF), a legacy signal field (L-SIG), and a universal signal field (U-SIG) of the PHY preamble.

16. The method of any of clauses 14 or 15, where the first portion of the PPDU further includes a non-legacy signal field of the PHY preamble.

17. The method of any of clauses 14-16, where the second portion of the PPDU includes the payload, a non-legacy short training field (STF) of the PHY preamble, and a non-legacy long training field (LTF) of the PHY preamble.

18. The method of any of clauses 14-17, further including:

selecting a sequence of LTF values associated with the distributed tone plan, the non-legacy LTF including the sequence of LTF values.

19. The method of any of clauses 14-18, further including:

selecting a sequence of STF values associated with the distributed tone plan, the non-legacy STF including the sequence of STF values.

20. The method of any of clauses 14-19, where the sequence of STF values is equal to the sequence of LTF values.

21. The method of any of clauses 14-20, where the M noncontiguous subcarrier indices coincide with a plurality of subchannels of the wireless channel that have the same bandwidth and power spectral density (PSD) limit, each of the plurality of subchannels including one or more of the M noncontiguous subcarrier indices.

22. The method of any of clauses 14-21, further including: determining a transmit power associated with the transmission of the second portion of the PPDU based on the PSD limit, the transmit power being evenly distributed across the M noncontiguous subcarrier indices.

23. The method of any of clauses 14-21, further including: determining a transmit power associated with the transmission of the second portion of the PPDU based on the PSD limit, the transmit power being evenly distributed across the plurality of subchannels.

24. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 14-23.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
generating a physical layer (PHY) convergence protocol (PLCP) protocol data unit (PPDU) including a PHY preamble and a payload in accordance with one or more legacy tone plans;
modulating a first portion of the PPDU on a number (N) of tones coinciding with N contiguous subcarrier indices spanning a first bandwidth of a wireless channel in accordance with the one or more legacy tone plans;
modulating a second portion of the PPDU on a number (M) of tones representing a logical resource unit (RU) associated with the one or more legacy tone plans, the logical RU spanning a second bandwidth of the wireless channel;
mapping the M tones to M noncontiguous subcarrier indices associated with the first bandwidth of the wireless channel in accordance with a distributed tone plan, the first bandwidth associated with the M noncontiguous subcarrier indices being greater than the second bandwidth associated with the logical RU;
transmitting the first portion of the PPDU via the N tones modulated with the N contiguous subcarrier indices of the first bandwidth; and
transmitting the second portion of the PPDU via the M tones mapped to the M noncontiguous subcarrier indices of the first bandwidth, such that a part of the first portion of the PPDU is transmitted via the M tones and all of the second portion of the PPDU is transmitted via the M tones, the M tones being a subset of the N tones.

2. The method of claim 1, wherein the first portion of the PPDU includes a legacy short training field (L-STF), a legacy long training field (L-LTF), a legacy signal field (L-SIG), and a universal signal field (U-SIG) of the PHY preamble.

3. The method of claim 2, wherein the first portion of the PPDU further includes a non-legacy signal field of the PHY preamble.

4. The method of claim 1, wherein the second portion of the PPDU includes the payload and a non-legacy long training field (LTF) of the PHY preamble.

5. The method of claim 4, wherein generating the PPDU comprises:
selecting a subset of LTF values from a sequence of LTF values associated with the first bandwidth of the wireless channel in accordance with locations of the M noncontiguous subcarrier indices relative to the first bandwidth of the wireless channel, the non-legacy LTF including only the subset of LTF values.

6. The method of claim 4, wherein generating the PPDU comprises:
selecting a subset of LTF values from a sequency of LTF values associated with the first bandwidth of the wireless channel in accordance with a location of the second bandwidth of the logical RU relative to the first bandwidth of the wireless channel, the non-legacy LTF including only the subset of LTF values.

7. The method of claim 1, wherein the M noncontiguous subcarrier indices coincide with a plurality of subchannels of the wireless channel that have an equivalent bandwidth and power spectral density (PSD) limit, each of the plurality of subchannels including one or more of the M noncontiguous subcarrier indices.

8. The method of claim 7, further comprising:
distributing a transmit power associated with transmission of the second portion of the PPDU evenly across the M noncontiguous subcarrier indices, the transmit power being in accordance with the PSD limit.

9. The method of claim 7, further comprising:
distributing a transmit power associated with transmission of the second portion of the PPDU evenly across the plurality of subchannels, the transmit power being in accordance with the PSD limit.

10. The method of claim 1, further comprising:
modulating a non-legacy short training field (STF) of the PHY preamble on a plurality of tones associated with the first bandwidth of the wireless channel in accordance with the one or more legacy tone plans, the non-legacy STF being transmitted with a transmit power equivalent to a transmit power of the second portion of the PPDU.

11. The method of claim 1, further comprising:
mapping the second portion of the PPDU to a plurality of spatial streams; and
applying a cyclic-shift delay (CSD) to one or more spatial streams of the plurality of spatial streams prior to the mapping of the M tones to the M noncontiguous subcarrier indices.

12. The method of claim 1, further comprising:
mapping the second portion of the PPDU to a plurality of spatial streams; and
applying a CSD to one or more spatial streams of the plurality of spatial streams after the mapping of the M tones to the M noncontiguous subcarrier indices.

13. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
generate a physical layer (PHY) convergence protocol (PLCP) protocol data unit (PPDU) including a PHY preamble and a payload in accordance with one or more legacy tone plans;
modulate a first portion of the PPDU on a number (N) of tones coinciding with N contiguous subcarrier indices spanning a first bandwidth of a wireless channel in accordance with the one or more legacy tone plans;
modulate a second portion of the PPDU on a number (M) of tones representing a logical resource unit (RU) associated with the one or more legacy tone plans, the logical RU spanning a second bandwidth of the wireless channel;
map the M tones to M noncontiguous subcarrier indices associated with the first bandwidth of the wireless channel in accordance with a distributed tone plan, the first bandwidth associated with the M noncontiguous subcarrier indices being greater than the second bandwidth associated with the logical RU;
transmit the first portion of the PPDU via the N tones modulated with the N contiguous subcarrier indices of the first bandwidth; and
transmit the second portion of the PPDU via the M tones mapped to the M noncontiguous subcarrier indices of the first bandwidth, such that a part of the first portion of the PPDU is transmitted via the M tones and all of the second portion of the PPDU is transmitted via the M tones, the M tones being a subset of the N tones.

14. The wireless communication device of claim 13, wherein the first portion of the PPDU includes a legacy short training field (L-STF), a legacy long training field (L-LTF), and a legacy signal field (L-SIG), and a universal signal field (U-SIG) of the PHY preamble and the second portion of the PPDU includes the payload and a non-legacy long training field (LTF) of the PHY preamble.

15. The wireless communication device of claim 14, wherein, to generate the PPDU, the processor-readable code, when executed by the at least one processor in conjunction with the at least one modem, is configured to:
select a subset of LTF values from a sequency of LTF values associated with the first bandwidth of the wireless channel in accordance with locations of the M noncontiguous subcarrier indices relative to the first bandwidth of the wireless channel, the non-legacy LTF including only the subset of LTF values.

16. The wireless communication device of claim 14, wherein, to generate the PPDU, the processor-readable code, when executed by the at least one processor in conjunction with the at least one modem, is configured to:
select a subset of LTF values from a sequency of LTF values associated with the first bandwidth of the wireless channel in accordance with a location of the second bandwidth associated with the logical RU relative to the first bandwidth of the wireless channel, the non-legacy LTF including only the subset of LTF values.

17. The wireless communication device of claim 14, wherein the first portion of the PPDU further includes a non-legacy signal field of the PHY preamble.

18. The wireless communication device of claim 13, wherein the M noncontiguous subcarrier indices coincide with a plurality of subchannels of the wireless channel that have an equivalent bandwidth and power spectral density (PSD) limit, each of the plurality of subchannels including one or more of the M noncontiguous subcarrier indices.

19. The wireless communication device of claim 18, wherein the processor-readable code, when executed by the at least one processor in conjunction with the at least one modem, is further configured to:
distribute a transmit power associated with transmission of the second portion of the PPDU evenly across the M noncontiguous subcarrier indices, the transmit power being in accordance with the PSD limit.

20. The wireless communication device of claim 18, wherein the processor-readable code, when executed by the at least one processor in conjunction with the at least one modem, is further configured to:

distribute a transmit power associated with transmission of the second portion of the PPDU evenly across the plurality of the subchannels, the transmit power being in accordance with the PSD limit.

21. The wireless communication device of claim 13, wherein the processor-readable code, when executed by the at least one processor in conjunction with the at least one modem, is further configured to:

modulate a non-legacy short training field (STF) of the PHY preamble on a plurality of tones associated with the first bandwidth of the wireless channel in accordance with the one or more legacy tone plans, the non-legacy STF being transmitted with a transmit power equivalent to a transmit power of the second portion of the PPDU.

22. The wireless communication device of claim 13, wherein the processor-readable code, when executed by the at least one processor in conjunction with the at least one modem, is further configured to:

map the second portion of the PPDU to a plurality of spatial streams; and apply a cyclic-shift delay (CSD) to one or more spatial streams of the plurality of spatial streams prior to the mapping of the M tones to the M noncontiguous subcarrier indices.

23. The wireless communication device of claim 13, wherein the processor-readable code, when executed by the at least one processor in conjunction with the at least one modem, is further configured to:

map the second portion of the PPDU to a plurality of spatial streams; and apply a cyclic shift delay (CSD) to one or more spatial streams of the plurality of spatial streams after the mapping of the M tones to the M noncontiguous subcarrier indices.

* * * * *